United States Patent
Lee et al.

(10) Patent No.: US 12,439,158 B2
(45) Date of Patent: *Oct. 7, 2025

(54) CAMERA MODULE WITH SENSOR SHIFTING ACTUATOR

(71) Applicant: SAMSUNG ELECTRO-MECHANICS CO., LTD., Suwon-si (KR)

(72) Inventors: Sang Jong Lee, Suwon-si (KR); Su Bong Jang, Suwon-si (KR); Hee Soo Yoon, Suwon-si (KR); Tae Ho Yun, Suwon-si (KR); Ju Ho Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 271 days.

This patent is subject to a terminal disclaimer.

(21) Appl. No.: 17/984,601

(22) Filed: Nov. 10, 2022

(65) Prior Publication Data

US 2023/0209198 A1 Jun. 29, 2023

(30) Foreign Application Priority Data

Dec. 28, 2021 (KR) ................ 10-2021-0190121

(51) Int. Cl.
*H04N 23/68* (2023.01)
*H04N 23/54* (2023.01)
*H04N 23/55* (2023.01)

(52) U.S. Cl.
CPC ........... *H04N 23/687* (2023.01); *H04N 23/54* (2023.01); *H04N 23/55* (2023.01); *H04N 23/6812* (2023.01)

(58) Field of Classification Search
CPC .................. H04N 23/6812; H04N 23/687
See application file for complete search history.

(56) References Cited

U.S. PATENT DOCUMENTS

| 10,863,094 B2 | 12/2020 | Sharma et al. |
| 2016/0085086 A1 | 3/2016 | Rho et al. |

(Continued)

FOREIGN PATENT DOCUMENTS

| CN | 105446053 A | 3/2016 |
| JP | 2010-152182 A | 7/2010 |

(Continued)

OTHER PUBLICATIONS

Korean Office Action issued on May 22, 2023, in counterpart Korean Patent Application No. 10-2021-0190121 (6 pages in English, 4 pages in Korean).

(Continued)

*Primary Examiner* — Cynthia Segura
(74) *Attorney, Agent, or Firm* — NSIP Law

(57) ABSTRACT

A sensor shifting actuator includes a sensor substrate on which an image sensor having an imaging surface is disposed; a base configured to accommodate the sensor substrate; and a driver configured to drive the image sensor in a first direction and a second direction, parallel to the imaging surface. The sensor substrate includes a movable portion on which the image sensor is disposed, a fixed portion coupled to the base, and a connection portion disposed between the movable portion and the fixed portion. Depending on a movement direction of the image sensor in the first direction or the second direction, the movable portion and the connection portion relatively move with respect to the fixed portion, or the movable portion relatively moves with respect to the connection portion.

18 Claims, 20 Drawing Sheets

(56) References Cited

U.S. PATENT DOCUMENTS

| | | |
|---|---|---|
| 2017/0289457 A1 | 10/2017 | Hu et al. |
| 2017/0324905 A1* | 11/2017 | Yu |
| 2019/0297261 A1* | 9/2019 | Wei .................. H04N 23/54 |
| 2021/0258491 A1* | 8/2021 | Park .................. H04N 23/687 |
| 2022/0094853 A1* | 3/2022 | Xu .................... H04N 23/54 |
| 2022/0102417 A1 | 3/2022 | Park et al. |
| 2022/0337753 A1 | 10/2022 | Oh |
| 2023/0221574 A1* | 7/2023 | Kim .................. H04N 23/6812 396/55 |

FOREIGN PATENT DOCUMENTS

| | | |
|---|---|---|
| JP | 2021-529344 A | 10/2021 |
| KR | 10-2020-0002358 A | 1/2020 |
| KR | 10-2020-0097086 A | 8/2020 |
| KR | 10-2021-0026659 A | 3/2021 |

OTHER PUBLICATIONS

Chinese Office Action Issued on Jul. 18, 2025, in Counterpart Chinese Patent Application No. 202211668973.3 (4 Pages in English, 8 Pages in Chinese).

* cited by examiner

CAMERA MODULE WITH SENSOR SHIFTING ACTUATOR

CROSS-REFERENCE TO RELATED APPLICATION(S)

This application claims the benefit under 35 USC 119(a) of Korean Patent Application No. 10-2021-0190121 filed on Dec. 28, 2021, in the Korean Intellectual Property Office, the entire disclosure of which is incorporated herein by reference for all purposes.

BACKGROUND

1. Field

The present disclosure relates to a camera module with a sensor shifting actuator.

2. Description of Related Art

Camera modules are now employed in mobile communication terminals such as smartphones, tablet PCs, and notebook computers.

Camera modules typically include an actuator with focus adjustment and shake correction functions to generate high-resolution images.

For example, a focus is adjusted by moving a lens module in an optical axis (Z-axis) direction, or shaking is corrected by moving the lens module in a direction orthogonal to the optical axis (Z-axis).

However, recently, with improvements in the performance of the camera module, the weight of the lens module also has been increasing, and there is also the influence of a weight of a driver for moving the lens module. Accordingly, precisely controlling the driving force of shake correction may be difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensor shifting actuator includes a sensor substrate on which an image sensor having an imaging surface is disposed; a base configured to accommodate the sensor substrate; and a driver configured to drive the image sensor in a first direction and a second direction, parallel to the imaging surface. The sensor substrate includes a movable portion on which the image sensor is disposed, a fixed portion coupled to the base, and a connection portion disposed between the movable portion and the fixed portion. Depending on a movement direction of the image sensor, the movable portion and the connection portion relatively move with respect to the fixed portion, or the movable portion relatively moves with respect to the connection portion.

The sensor substrate may further include a first bridge configured to connect the fixed portion and the connection portion to each other in the first direction, and a second bridge configured to connect the movable portion and the connection portion to each other in the second direction. Each of the first bridge and the second bridge may include a plurality of bridge elements. The first direction and the second direction may be orthogonal to each other. Each of the bridge elements may extend in a connection direction.

The first bridge elastically may deform when the image sensor moves in the first direction, and the second bridge elastically may deform when the image sensor moves in the second direction.

Each of the bridge elements may have a width and a height, and the width may be less than the height. The width may extend in a direction orthogonal to a length direction of each of the bridge elements, in a plane parallel to the imaging surface. The height may extend in a direction orthogonal to the imaging surface.

Each of the bridge elements may include a bridge part and a trace part disposed at an end of the bridge part. A signal of the image sensor may be transmitted external of the image sensor by the trace part.

The sensor shifting actuator may further include a holder coupled to the movable portion. The driver may include a coil portion disposed on one of the holder or the base, and a movable yoke portion disposed on another of the holder or the base. The movable yoke portion may be formed of a soft magnetic material magnetized by a magnetic field of the coil portion.

The coil portion and the movable yoke portion may be disposed to oppose each other in a direction parallel to the imaging surface.

An upper surface of the movable portion may be positioned higher in a direction, orthogonal to the imaging surface, than an upper surface of the fixed portion and an upper surface of the connection portion.

The driver may include a coil portion disposed on one of the movable portion or the base, and a magnet portion disposed on another of the movable portion or the base. The coil portion and the magnet portion may be disposed to oppose each other in a direction orthogonal to the imaging surface.

The connection portion may be configured to surround the movable portion, and the fixed portion is configured to surround the connection portion. The coil portion and the magnet portion may be positioned in a space between the fixed portion and the connection portion, when viewed from the direction orthogonal to the imaging surface.

The sensor shifting actuator may include a position sensor portion configured to sense a position of the image sensor, the position sensor portion including a sensing coil disposed on one of the movable portion or the base, and a sensing yoke portion disposed on another of the movable portion or the base. The sensing yoke portion may include a plurality of sensing yokes spaced apart from each other in the direction parallel to the imaging surface. A width of each of the sensing yokes may be configured to change in the movement direction of the image sensor.

The plurality of sensing yokes may include a first sensing yoke and a second sensing yoke. Each of the first sensing yoke and the second sensing yoke may oppose the sensing coil in the direction orthogonal to the imaging surface.

Each of the first sensing yoke and the second sensing yoke may have an increasing or decreasing width in the movement direction of the image sensor. The first sensing yoke and the second sensing yoke have shapes different from each other in terms of a position of the increasing or decreasing width.

Each of the first sensing yoke and the second sensing yoke may have an hourglass-shape. The first sensing yoke and the second sensing yoke may be offsettedly spaced apart from each other.

Dimensions of the hourglass-shapes of the first sensing yoke and the second sensing yoke may be different.

In another general aspect, a camera module includes a lens module including at least one lens, a housing configured to accommodate the lens module, a focus adjustment driver configured to move the lens module in an optical axis direction, a sensor substrate having an image sensor disposed thereon, a base coupled to the housing, the base configured to accommodate the sensor substrate, and a shake correction driver configured to drive the image sensor in a first direction and a second direction, orthogonal to the optical axis direction. The sensor substrate includes a movable portion configured to move with the image sensor in the first direction and the second direction, a fixed portion coupled to the base, and a connection portion disposed between the movable portion and the fixed portion. The connection portion is configured to move with the movable portion in the first direction or the second direction.

The sensor substrate may further include a first bridge configured to connect the fixed portion and the connection portion to each other in the second direction, and a second bridge configured to connect the movable portion and the connection portion to each other in the first direction. Each of the first bridge and the second bridge may include at least one electrical trace configured to transmit a signal external of the image sensor.

The camera module may further include a reflective member disposed in front of the lens module, the reflective member may be configured to change a path of incident light to the lens module.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
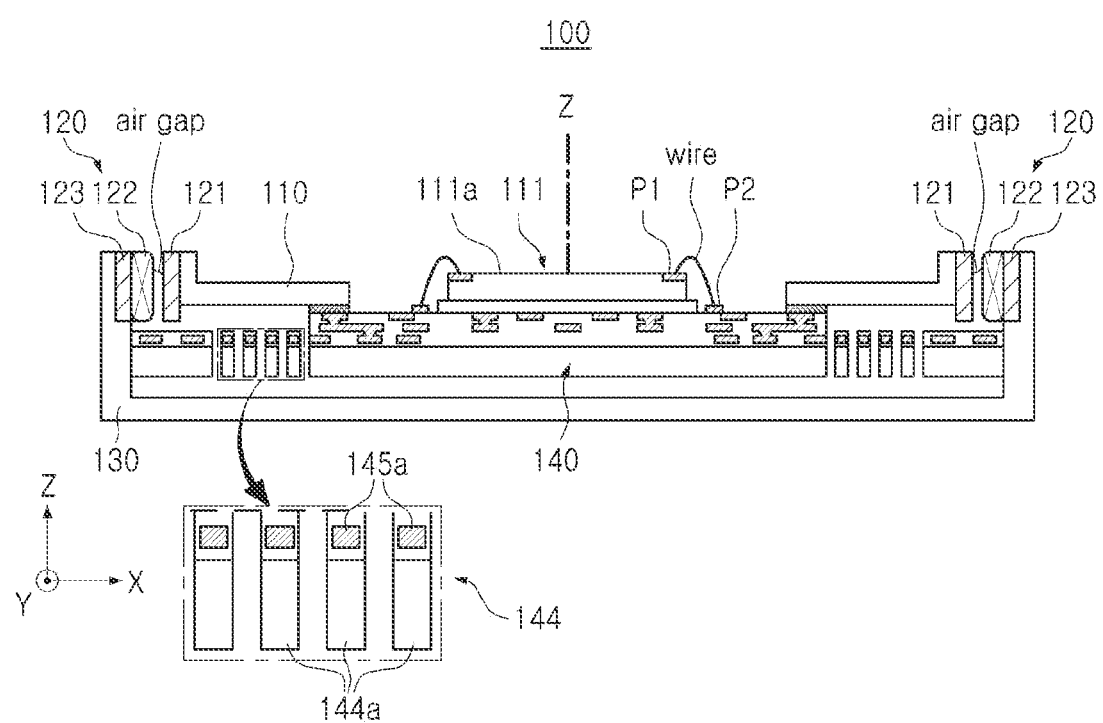
FIG. 1 is a schematic cross-sectional view of a sensor shifting actuator according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A sensor shifting actuator, according to an example embodiment of the present disclosure, may be a camera module component. In addition, the camera module may be mounted in a portable electronic device. The portable electronic device may be a mobile communication terminal, a smartphone, or a tablet PC, for example.

Figure 2:
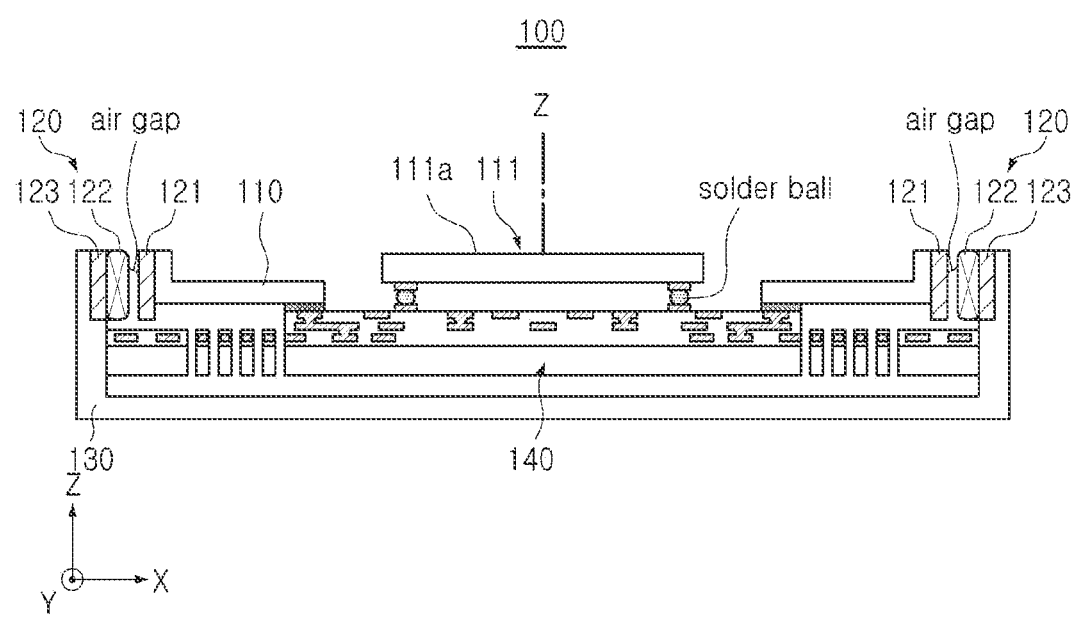
FIG. 2 is a diagram illustrating an example in which a connection between an image sensor and a sensor substrate is changed in FIG. 1.

FIG. 1 is a schematic cross-sectional view of a sensor shifting actuator according to an example embodiment of the present disclosure. FIG. 2 is a diagram illustrating an example in which a connection between an image sensor and a sensor substrate is changed in FIG. 1.

Referring to FIGS. 1 and 2, a sensor shifting actuator 100 may include a sensor substrate 140, a base 130, and a driver 120.

An image sensor 111 may be disposed on the sensor substrate 140, and a portion of the sensor substrate 140 may be configured to be relatively movable with respect to the base 130.

A portion of the sensor substrate 140 may be a component moving together with the image sensor 111.

The image sensor 111 may be disposed on a surface of the sensor substrate 140. In an example embodiment, contact points P1 and P2 of the image sensor 111 and the sensor substrate 140 may be electrically connected by wire bonding (see FIG. 1). In another example embodiment, the image sensor 111 and the sensor substrate 140 may be electrically connected to each other through a solder ball at the corresponding contact points P1 and P2 (see FIG. 2).

The base 130 may have a box shape with an open upper portion, and the sensor substrate 140 may be disposed in an inner space of the base 130.

The driver 120 may move a portion of the sensor substrate 140 and the image sensor 111.

Through the driver 120, the image sensor 111 may move in a direction, orthogonal to the direction in which an imaging surface 111a of the image sensor 111 is directed. In an example embodiment, the driver 120 may correct shaking occurring during image capturing of the camera module 1 on which the image sensor 111 is mounted.

The driver 120 may allow a portion of the sensor substrate 140 on which the image sensor 111 is mounted to move in a first direction (X-direction) and a second direction (Y-direction), orthogonal to an optical axis (Z-axis). The first direction (X-direction) and the second direction (Y-direction) may intersect each other. For example, the driver 120 may allow a portion of the sensor substrate 140 to move in the first direction (X-direction) and/or the second direction (Y-direction), orthogonal to the optical axis (Z-axis), and accordingly, shaking may be corrected.

In the present specification, a direction in which the imaging surface 111a of the image sensor 111 is directed may be referred to as an optical axis (Z-axis) direction. That is, the image sensor 111 may move in a direction orthogonal to the optical axis (Z-axis) with respect to the base 130.

In the drawings of the present specification, the image sensor 111 moving in a direction parallel to the imaging surface 111a, may be understood as the image sensor 111 moving in the direction, orthogonal to the optical axis (Z-axis).

The image sensor 111 moving in the first direction (X-direction) may be understood as the image sensor 111 moving in the direction orthogonal to the optical axis (Z-axis). For another example, the movable yoke portion 121 and the coil portion 122 opposing each other in the first direction (X-direction) may be understood as the movable yoke portion 121 and the coil portion 122 opposing each other in the direction, orthogonal to the optical axis (Z-axis).

In addition, the first direction (X-direction) and the second direction (Y-direction) may be examples of two directions, orthogonal to the optical axis (Z-axis) and intersecting each other. In the present specification, the first direction (X-direction) and the second direction (Y-direction) may be understood as two directions, orthogonal to the optical axis (Z-axis) and intersecting each other.

Figure 3:
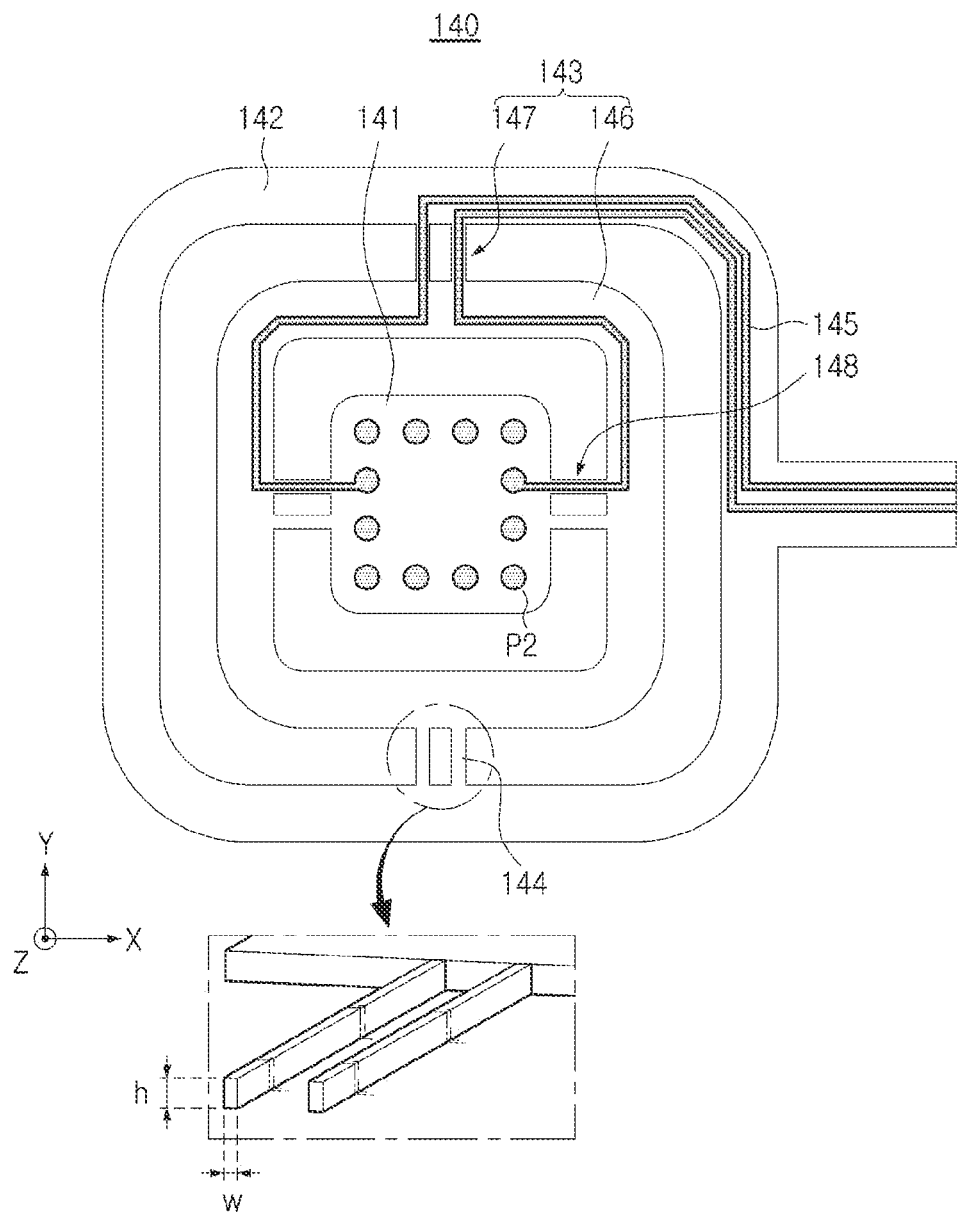
FIG. 3 is a plan view of a sensor substrate according to an example embodiment.

FIG. 3 is a plan view of a sensor substrate according to an example embodiment.

Referring to FIG. 3, the sensor substrate 140 may support the image sensor 111 such that the image sensor 111 moves in a direction orthogonal to an optical axis (Z-axis) with respect to the base 130.

A portion of the sensor substrate 140 may be deformed according to the movement of the image sensor 111 with respect to the base 130. That is, a portion of the sensor substrate 140 may be flexible. When the sensor substrate 140 is deformed, restoring force may be generated in the sensor substrate 140. Such restoring force may allow the image sensor 111 to return to its original position. As current is applied to the coil portion 122, a portion of the sensor substrate 140 in an equilibrium state may move with respect to the base 130. When no current flows in the coil portion 122, the sensor substrate 140 may be returned to its original position by restoring force.

Referring to FIGS. 1 to 3, the sensor substrate 140 may include a movable portion 141 on which the image sensor 111 is seated, and a fixed portion 142 fixed to the base 130.

The contact points P1 and P2 of the image sensor 111 and the movable portion 141 may be electrically connected to each other by wire bonding. Alternatively, the image sensor 111 and the movable portion 141 may be electrically connected to each other through a solder ball at the corresponding contact points P1 and P2.

The image sensor 111 and the movable portion 141 may move with respect to the fixed portion 142. The sensor substrate 140 may include a supporting portion 143 connecting the movable portion 141 and the fixed portion 142 to each other. The supporting portion 143 may be at least partially deformed according to the relative movement between the movable portion 141 and the fixed portion 142. For example, the supporting portion 143 may be formed of a flexible substrate. The flexible substrate may be provided in a form in which a conductive pattern (or an electric trace 145) is formed inside a film formed of a polyimide material.

In an example embodiment, the movable portion 141 may have a height different from those of the fixed portion 142 and the supporting portion 143. The height may refer to a height in a direction in which the imaging surface 111a is directed.

Referring to FIGS. 1 and 2, a surface of the movable portion 141 may be placed at a position higher than those of a surface of the fixed portion 142 and a surface of the supporting portion 143. For example, the movable portion 141 may be provided as a multilayer substrate. A holder 110 on which the driver 120 is mounted may be attached to the movable portion 141, and thus the movable portion 141 may be positioned higher than the fixed portion 142 and the supporting portion 143, thereby preventing interference with the holder 110 and the sensor substrate 140 during movement of the movable portion 141 and the holder 110.

In an example embodiment, the sensor substrate 140 may include a plurality of bridge elements 144 connecting between the movable portion 141 and the fixed portion 142. The plurality of bridge elements 144 may be included in at least a portion of the supporting portion 143.

The plurality of bridge elements 144 may be formed of a flexible material, and may be deformed when the movable portion 141 moves with respect to the fixed portion 142. When the image sensor 111 and the movable portion 141 move with respect to the base 130, the bridge elements 144 may be deformed. Restoring force generated when the bridge elements 144 are deformed may allow the image sensor 111 and the movable portion 141 to return to the original positions thereof.

The plurality of bridge elements 144 may respectively embed at least one electrical trace 145. That is, the plurality of bridge elements 144 may electrically connect the movable portion 141 to the fixed portion 142 to each other while mechanically connecting the movable portion 141 to the fixed portion 142 to each other.

Accordingly, the bridge elements 144 may function as a path for transmitting a signal of the image sensor 111 while supporting the image sensor 111.

The plurality of bridge elements 144 may include a bridge part 144a and a trace part 145a. Referring to FIG. 1, the trace part 145a may be disposed at an end of the bridge part 144a.

In another example embodiment, the trace part 145a may be disposed at the end and the other end of the bridge part 144a, respectively.

The bridge part 144a may mechanically connect the movable portion 141 to the fixed portion 142, and the trace part 145a may electrically connect the movable portion 141 to the fixed portion 142.

The plurality of bridge elements 144 may be formed by an etching process. Accordingly, side surfaces of the bridge parts 144a of the plurality of bridge elements 144 may include curved surfaces.

In an example embodiment, the sensor substrate 140 may include a connection portion 146 disposed between the movable portion 141 and the fixed portion 142. For example, the connection portion 146 may be provided in the form of a square frame surrounding the movable portion 141.

The connection portion 146 may be configured to surround the movable portion 141, and the fixed portion 142 may be configured to surround the connection portion 146.

A space may be formed between the movable portion 141 and the connection portion 146 to accommodate a movement range of the movable portion 141 with respect to the connection portion 146. In addition, a space may be formed between the connection portion 146 and the fixed portion 142 to accommodate a movement range of the connection portion 146 with respect to the fixed portion 142.

The fixed portion 142, the connection portion 146, and the movable portion 141 may be connected through the bridge elements 144. For example, the sensor substrate 140 may include a first bridge 147 connecting the fixed portion 142 and the connection portion 146 to each other, and a second bridge 148 connecting the movable portion 141 and the connection portion 146 to each other.

The first bridge 147 and the second bridge 148 may extend in a direction orthogonal to the optical axis (Z-axis). The first bridge 147 and the second bridge 148 may extend in a direction intersecting each other. For example, the first bridge 147 may extend in a Y-direction, and the second bridge 148 may extend in an X-direction.

The first bridge 147 and the second bridge 148 may respectively include one or more bridge elements 144. In FIG. 3, the first bridge 147 may include four bridge elements 144 extending in the Y-direction, and the second bridge 148 may include four bridge elements 144 extending in the X-direction. However, the present disclosure is not limited to the number of respective bridge elements 144.

Referring back to FIG. 3, the sensor substrate 140 may include an electrical trace 145 transmitting a signal of the image sensor 111. Multiple bridge elements 144 included in the supporting portion 143 may embed the electrical trace 145. The image sensor 111 may be electrically connected to the movable portion 141 of the sensor substrate 140. The electrical trace 145 may extend from each of the contact points P2 formed on the movable portion 141. The electrical trace 145 may extend to the fixed portion 142 through the bridge elements 144. The electric trace 145 extending to the fixed portion 142 may be electrically connected to another substrate or an electronic component.

FIG. 3 schematically illustrates the electrical trace 145 formed on the sensor substrate 140, and only illustrates the electrical trace 145 extending from some contact points for ease of description.

The bridge elements 144 may respectively have a width and a height. For example, the width may refer to a width in a direction orthogonal to a direction in which the bridge elements 144 extend in an X-Y plane. For example, a width of each of the bridge elements 144 of the first bridge 147 may refer to a width in the X-direction, and a width of each of the bridge elements 144 of the second bridge 148 may refer to a width in the Y-direction.

In addition, the height may refer to a height in an optical axis (Z-axis) direction.

The bridge elements 144 may respectively have a shape having a width less than a height. Through such a shape, a direction in which the bridge elements 144 are bent may be limited. For example, the bridge elements 144 of the first bridge 147 may be bent in a first direction (X-direction), and the bridge elements 144 of the second bridge 148 may be bent in a second direction (Y-direction).

FIGS. 4A to 4D illustrate a state in which the sensor substrate 140 is deformed according to the movement of an image sensor.

The image sensor 111 and a portion of the sensor substrate 140 may be moved together. Here, the portion of the sensor substrate 140 moving together with the image sensor 111 may change depending on a direction in which the image sensor 111 is moved. For example, when the image sensor 111 moves in a direction (for example, an X-direction), the movable portion 141 and the connection portion 146 of the sensor substrate 140 may be moved together with the image sensor 111. In addition, when the image sensor 111 moves in the other direction (for example, a Y-direction), the movable portion 141 of the sensor substrate 140 may be moved together with the image sensor 111.

Figure 4A:
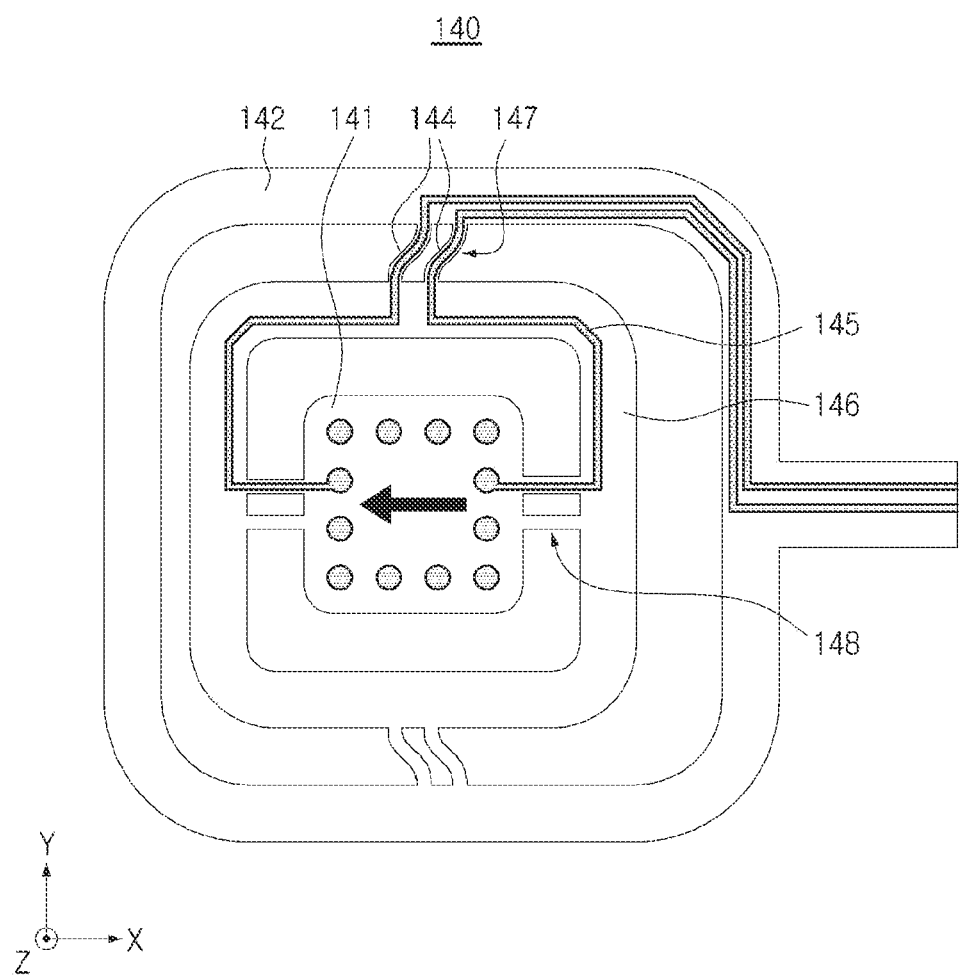
FIGS. 4A to 4D illustrate a state in which a sensor substrate 140 is deformed according to the movement of an image sensor.

Referring to FIG. 4A, when the image sensor 111 moves in a −X-direction, the movable portion 141 and the connection portion 146 of the sensor substrate 140 may also move in the −X-direction, and accordingly, the first bridge 147 connecting the connection portion 146 and the fixed portion 142 to each other may be deformed. The bridge elements 144 included in the first bridge 147 may have elasticity, and thus the deformed first bridge 147 may provide restoring force to return the movable portion 141 in a direction (that is, +X-direction), opposite to a movement direction. Accordingly, when no current is applied to the driver 120, the movable portion 141 and the connection portion 146 may move in the +X-direction.

Figure 4B:
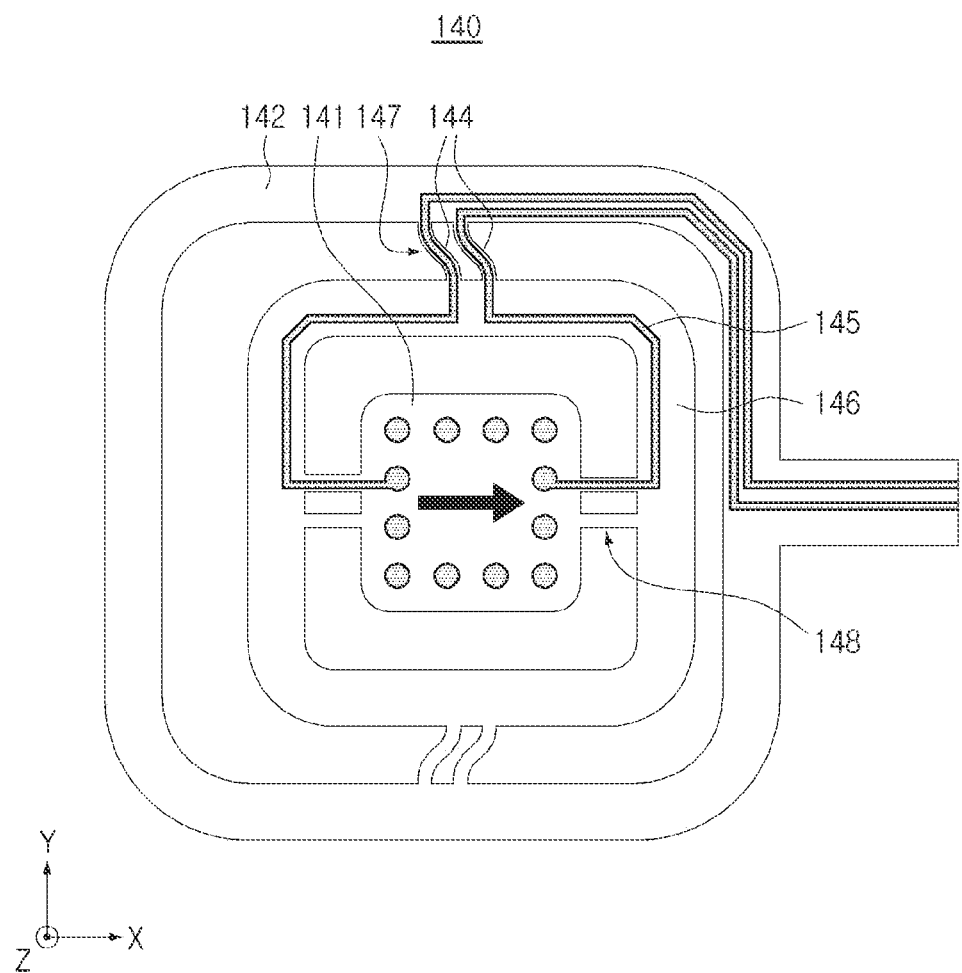

Referring to FIG. 4B, when the image sensor 111 moves in the +X-direction, the movable portion 141 and the connection portion 146 of the sensor substrate 140 may also move in the +X-direction, and accordingly, the first bridge 147 connecting the connection portion 146 and the fixed portion 142 to each other may be deformed. The bridge elements 144 included in the first bridge 147 may have elasticity, and thus the deformed first bridge 147 may provide restoring force to return the movable portion 141 in a direction (that is, −X-direction), opposite to the movement direction. Accordingly, when no current is applied to the driver 120, the movable portion 141 and the connection portion 146 may move in the −X-direction.

Figure 4C:
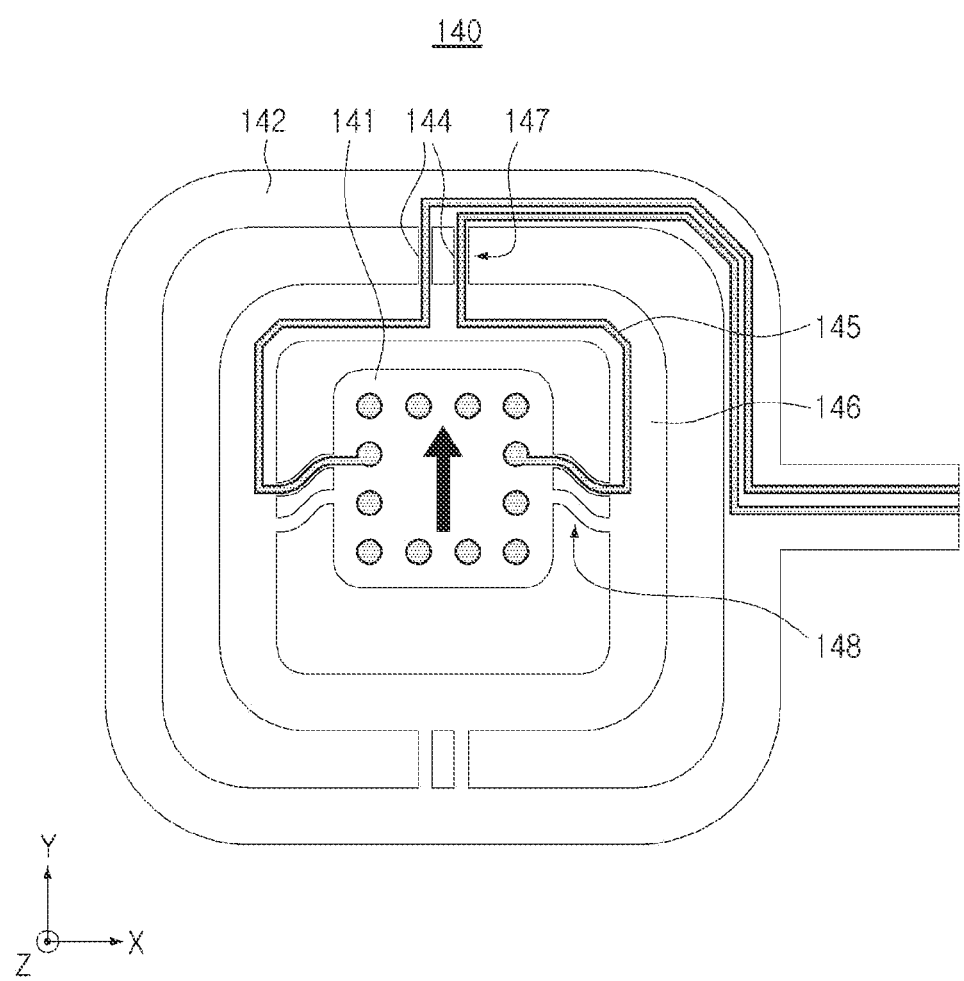

Referring to FIG. 4C, when the image sensor 111 moves in a +Y-direction, the movable portion 141 of the sensor substrate 140 may also move in the +Y-direction, and thus the second bridge 148 connecting the movable portion 141 and the connection portion 146 to each other may be deformed. The bridge elements 144 included in the second bridge 148 may have elasticity, and thus the deformed second bridge 148 may provide restoring force to return the movable portion 141 in a direction (that is, −Y-direction), opposite to the movement direction. Accordingly, when no current is applied to the driver 120, the movable portion 141 may move in the −Y-direction.

Figure 4D:
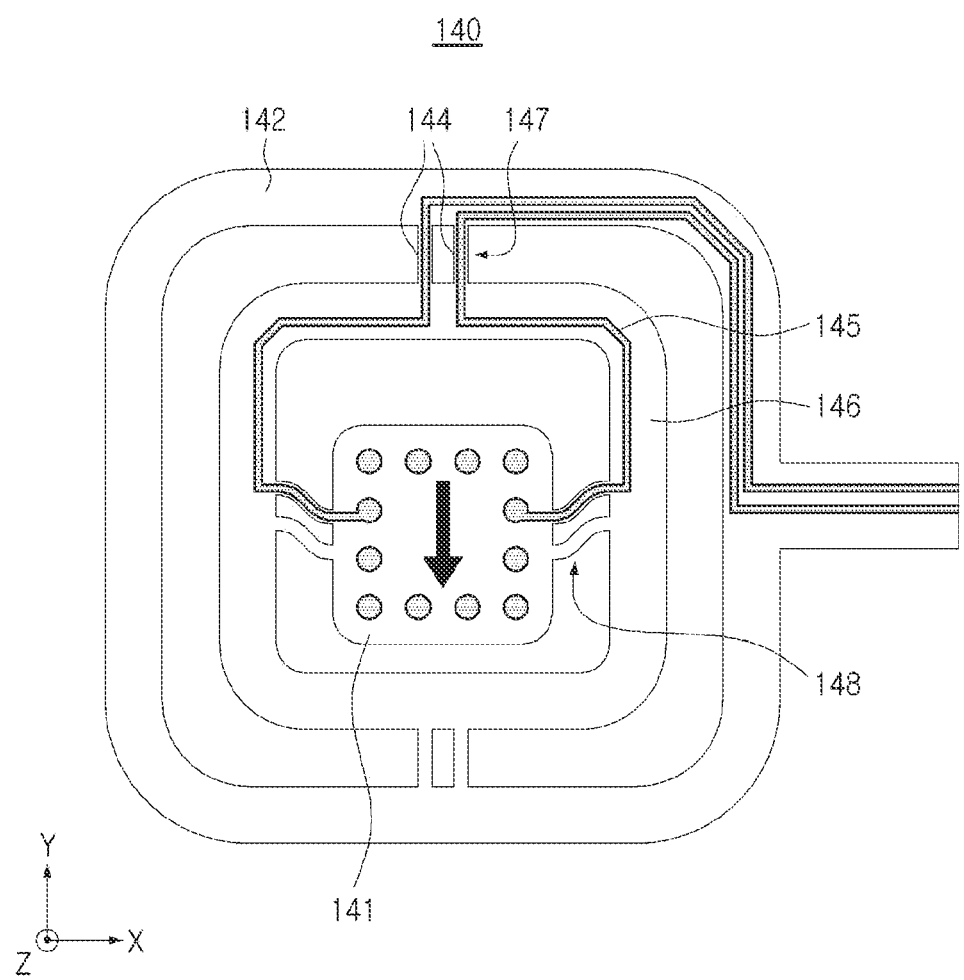

Referring to FIG. 4D, when the image sensor 111 moves in the −Y-direction, the movable portion 141 of the sensor substrate 140 may also move in the −Y-direction, and thus the second bridge 148 connecting the movable portion 141 and the connection portion 146 to each other may be deformed. The bridge elements 144 included in the second bridge 148 may have elasticity, and thus the deformed second bridge 148 may provide restoring force to return the movable portion 141 in a direction (that is, +Y-direction), opposite to the movement direction. Accordingly, when no current is applied to the driver 120, the movable portion 141 may move in the +Y-direction.

Referring back to FIGS. 1 and 2, in an example embodiment, the driver 120 may include the coil portion 122 and the movable yoke portion 121 disposed to oppose each other.

One of the coil portion 122 and the movable yoke portion 121 may be coupled to the base 130, and the other one may be coupled to the holder 110. The holder 110 may be coupled to the movable portion 141 of the sensor substrate 140 to move together with the movable portion 141.

In an example embodiment, the holder 110 may be omitted. That is, one of the coil portion 122 and the movable yoke portion 121 may be coupled to the base 130, and the other one may be coupled to the movable portion 141 of the sensor substrate 140.

The movable yoke portion 121 and the coil portion 122 may oppose each other in a direction orthogonal to an optical axis (Z-axis). An electromagnetic interaction between the movable yoke portion 121 and the coil portion 122 may allow the image sensor 111 to move in the direction orthogonal to the optical axis (Z-axis) with respect to the base 130.

In an example embodiment, the driver 120 may further include a back yoke portion 123 disposed on a side of the coil portion 122. The back yoke portion 123 may allow a magnetic field generated by the coil portion 122 to be concentrated only in a direction toward the movable yoke portion 121. The back yoke portion 123 disposed on the side of the coil portion 122 may prevent or minimize the magnetic field generated by the coil portion 122 from affecting other electronic components. The back yoke portion 123 may be disposed between the base 130 and the coil portion 122.

In the present specification, it is described that the coil portion 122 may be coupled to the base 130, and the movable yoke portion 121 may be coupled to the holder 110, for ease of description. In another example embodiment, the coil portion 122 may be coupled to the holder 110, and the movable yoke portion 121 may be coupled to the base 130.

An air gap may be formed between the coil portion 122 and the movable yoke portion 121 opposing each other. For example, a space may be formed between the coil portion 122 and the movable yoke portion 121 opposing each other. That is, no other member (for example, a magnet) may be present between the coil portion 122 and the movable yoke portion 121 opposing each other. The coil portion 122 and the movable yoke portion 121 may directly oppose each other with an air gap formed therebetween.

In an example embodiment, the driver 120 may not include a permanent magnet. In an example embodiment, when no current flows in the coil portion 122, a magnetic field caused by the movable yoke portion 121 may be 0 (zero) or may be on a significantly low level, thereby preventing or minimizing a magnetic field caused by the driver 120 itself from affecting other electronic components (for example, other electronic components in the camera module 1, or other electronic components in the camera module 1).

In an example embodiment, the movable yoke portion 121 may be formed of a soft magnetic material. The soft magnetic material may have small coercive force, and may be magnetized when exposed to a magnetic field, and may lose magnetism or may have a relatively low level of magnetism when the magnetic field disappears.

When current is applied to the coil portion 122, the movable yoke portion 121 may be magnetized, thereby generating reluctance force between the coil portion 122 and the movable yoke portion 121. Attractive force may be generated in a direction in which the movable yoke portion 121 and the coil portion 122 oppose each other. The attractive force may allow the image sensor 111 to move in a corresponding direction with respect to the base 130.

Figure 5:
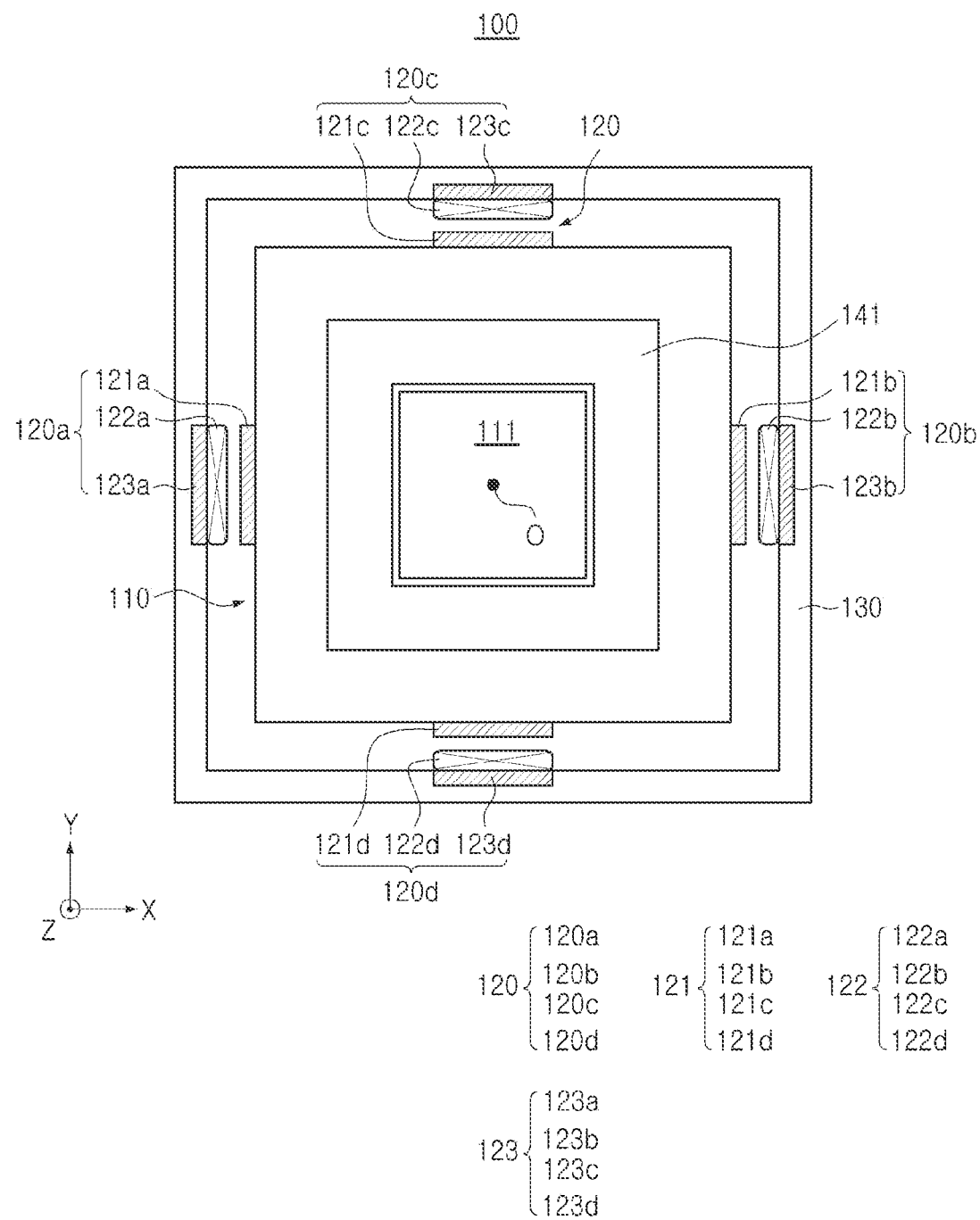
FIG. 5 is a schematic plan view of a sensor shifting actuator according to an example embodiment of the present disclosure, FIGS. 6A to 6D schematically illustrate a state in which an image sensor is moved.

FIG. 5 is a schematic plan view of a sensor shifting actuator according to an example embodiment of the present disclosure.

Referring to FIG. 5, the coil portion 122 may include a first coil 122a, a second coil 122b, a third coil 122c, and a fourth coil 122d, and the movable yoke portion 121 may include a first movable yoke 121a, a second movable yoke 121b, a third movable yoke 121c, and a fourth movable yoke 121d. In addition, the back yoke portion 123 may include a first back yoke 123a, a second back yoke 123b, a third back yoke 123c, and a fourth back yoke 123d.

The first coil 122a to the fourth coil 122d may be respectively disposed on an inner surface of the base 130. The first coil 122a and the second coil 122b may be spaced apart from each other in a first direction (X-direction), and the third coil 122c and the fourth coil 122d may be spaced apart from each other in a second direction (Y-direction). Accordingly, a direction in which the first coil 122a and the second coil 122b are spaced apart from each other may be orthogonal to a direction in which the third coil 122c and the fourth coil 122d are spaced apart from each other.

The first movable yoke 121a to the fourth movable yoke 121d may be disposed on an outer surface of the holder 110 to oppose the first coil 122a to the fourth coil 122d, respectively.

When current is applied to the first coil 122a, attractive force may be generated between the first coil 122a and the first movable yoke 121a. The attractive force may move the image sensor 111 in a −X-direction. Conversely, when current is applied to the second coil 122b, attractive force may be generated between the second coil 122b and the second movable yoke 121b. The attractive force may move the image sensor 111 in a +X-direction.

In addition, when current is applied to the third coil 122c, attractive force may be generated between the third coil 122c and the third movable yoke 121c. The attractive force may move the image sensor 111 in a +Y-direction. Conversely, when current is applied to the fourth coil 122d, attractive force may be generated between the fourth coil 122d and the fourth movable yoke 121d. The attractive force may move the image sensor 111 in a −Y-direction.

The driver 120 may include a plurality of unit drivers 120a, 120b, 120c, and 120d. The plurality of unit drivers 120a, 120b, 120c, and 120d may respectively include a movable yoke and a coil opposing each other.

Only attractive force may be generated between the coil and the movable yoke opposing each other, and thus at least two unit drivers may be desired to reciprocate the image sensor 111 in a direction.

Referring to FIG. 5, the driver 120 may include a first unit driver 120a disposed in a −X-direction of the image sensor 111 and a second unit driver 120b disposed in a +X-direction of the image sensor 111 so as to correct shaking in an X-direction.

The first unit driver 120a may include the first movable yoke 121a coupled to the holder 110, and the first coil 122a coupled to the base 130. The second unit driver 120b may include the second movable yoke 121b coupled to the holder 110, and the second coil 122b coupled to the base 130.

The driver 120 may include a third unit driver 120c disposed in a +Y-direction of the image sensor 111 and a fourth unit driver 120d disposed in a −Y-direction of the image sensor 111 so as to correct shaking in a Y-direction.

The third unit driver 120c may include the third movable yoke 121c coupled to the holder 110, and the third coil 122c coupled to the base 130. The fourth unit driver 120d may include the fourth movable yoke 121d coupled to the holder 110, and the fourth coil 122d coupled to the base 130.

FIGS. 6A to 6D schematically illustrate a state in which an image sensor is moved.

Figure 6A:
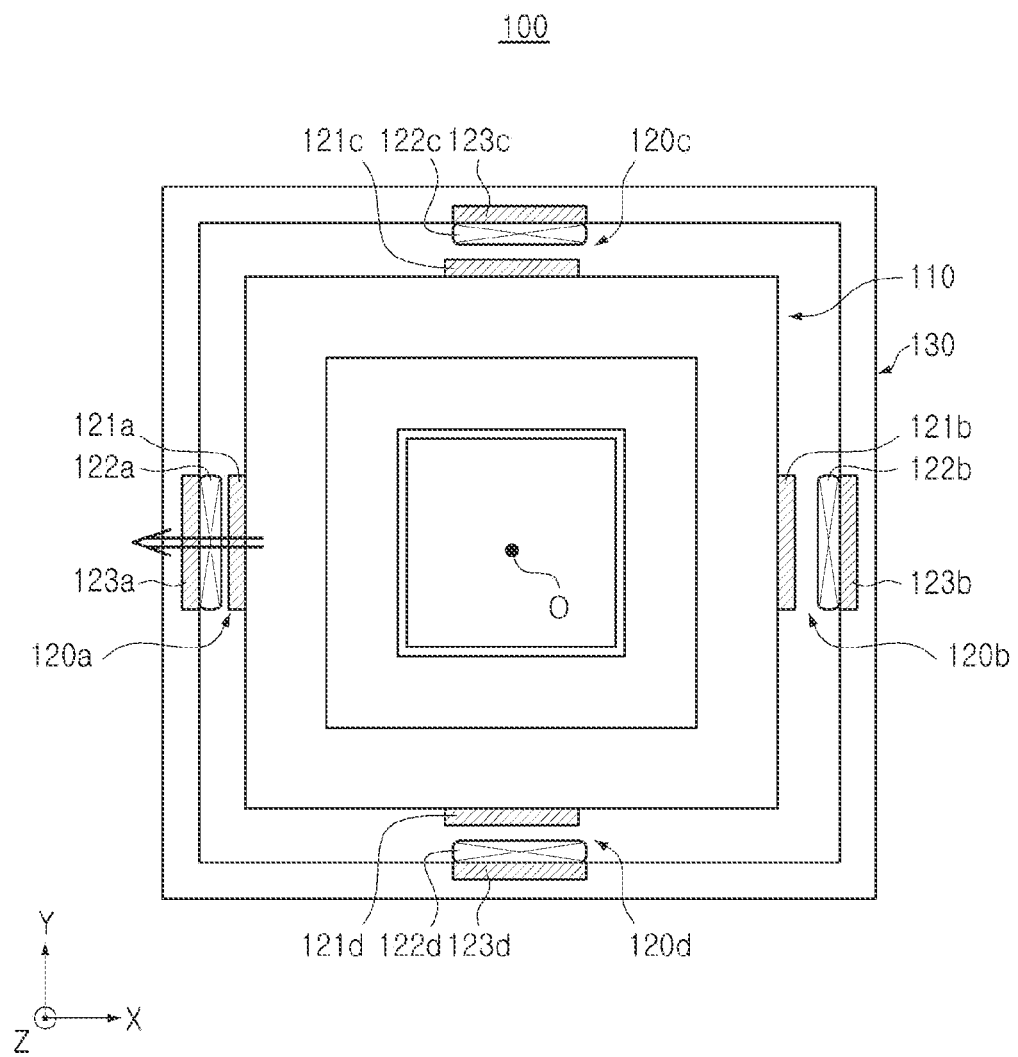

Referring to FIG. 6A, current may be applied to the first coil 122a, such that the first coil 122a may pull the first movable yoke 121a in a direction of the arrow, which may move the image sensor 111 in a −X-direction.

Figure 6B:
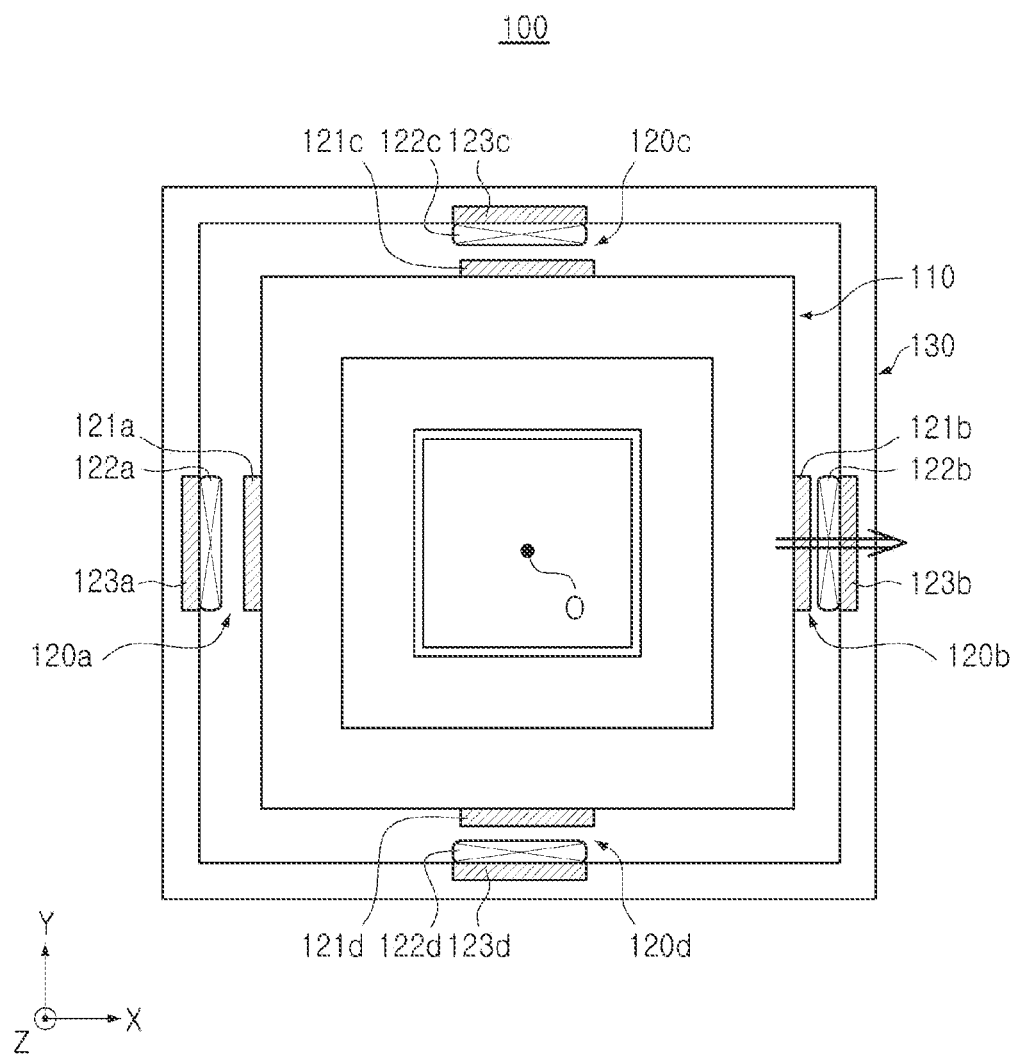

Referring to FIG. 6B, current may be applied to the second coil 122b, such that the second coil 122b may pull the second movable yoke 121b in the arrow direction, which may move the image sensor 111 in a +X-direction.

Figure 6C:
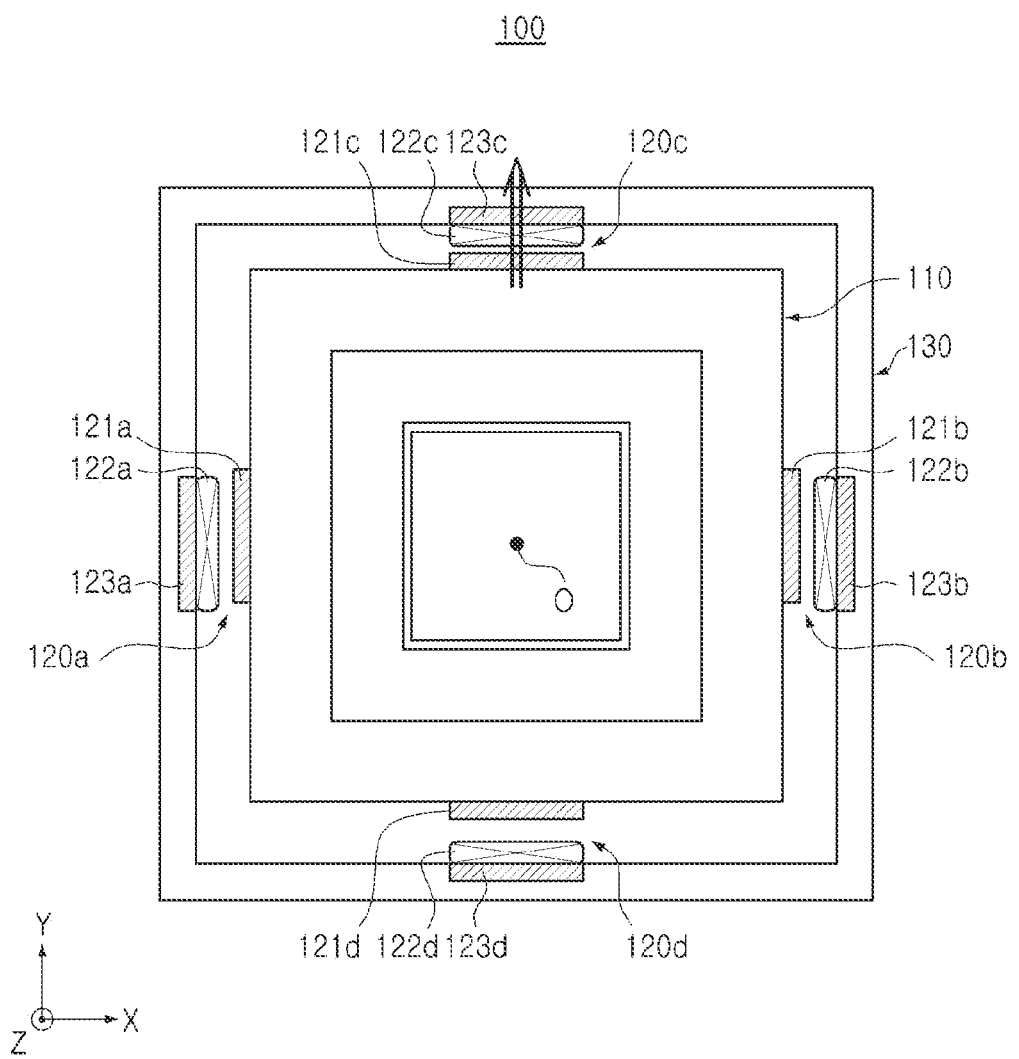

Referring to FIG. 6C, current may be applied to the third coil 122c, such that the third coil 122c may pull the third movable yoke 121c in the direction of the arrow, which may move the image sensor 111 in a +Y-direction.

Figure 6D:
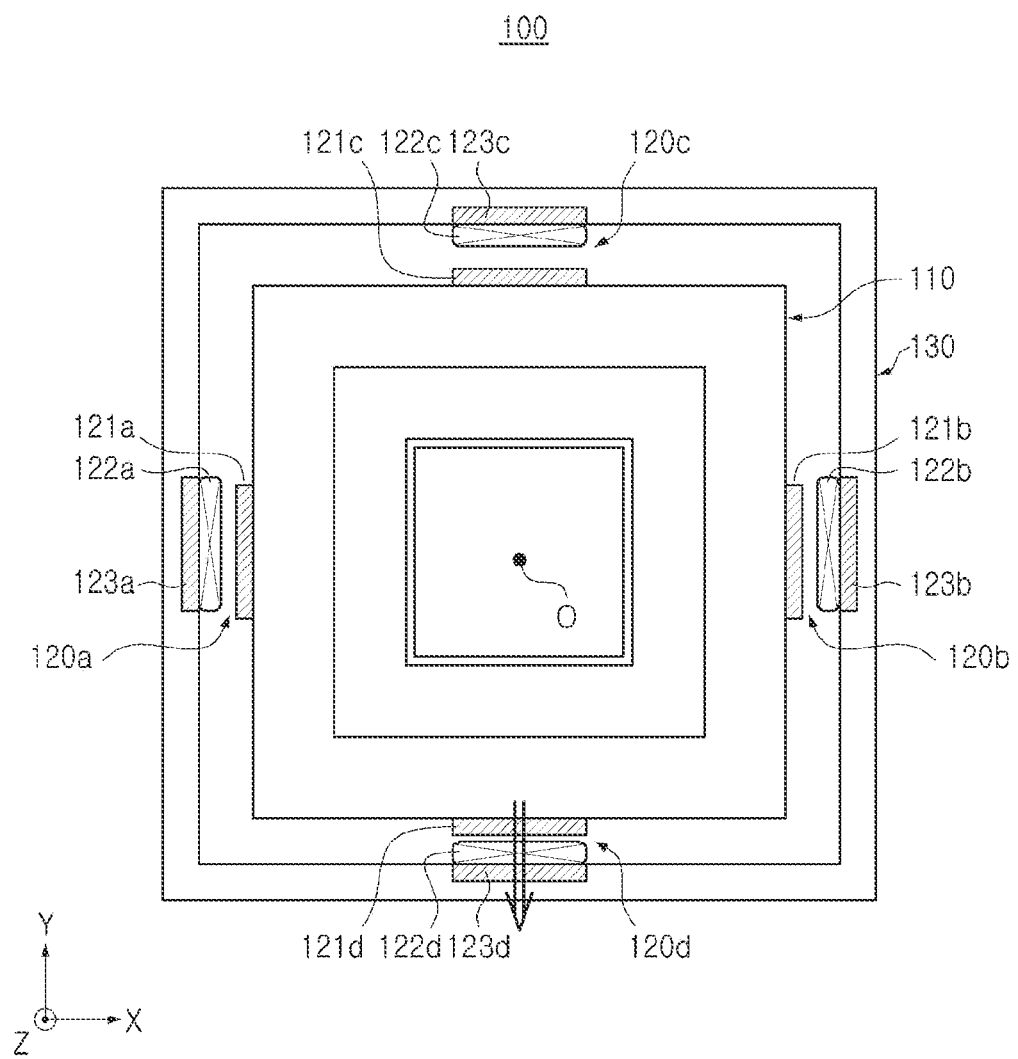

Referring to FIG. 6D, current may be applied to the fourth coil 122d, such that the fourth coil 122d may pull the fourth movable yoke 121d in the direction of the arrow, which may move the image sensor 111 in a −Y-direction.

Figure 7A:
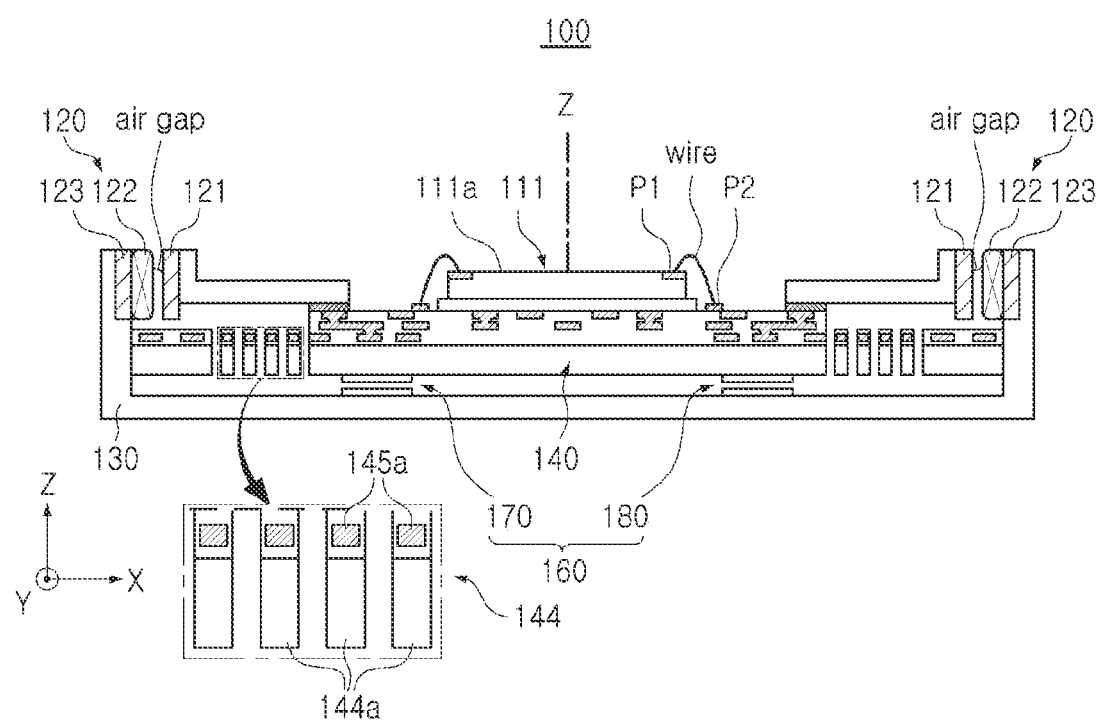
FIG. 7A illustrates an example in which a position sensor portion is further included in a sensor shifting actuator.
Figure 7B:
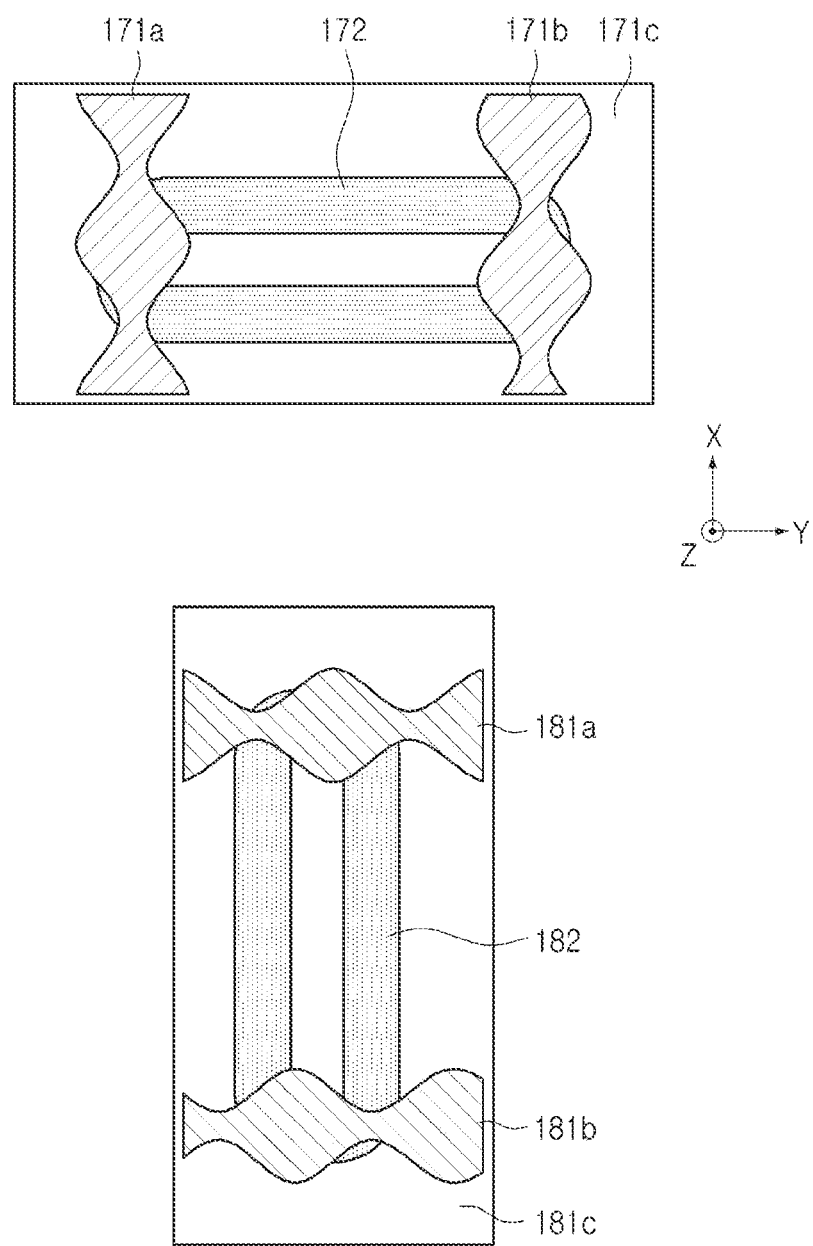
FIG. 7B is a diagram illustrating a schematic configuration of a position sensor portion.
Figure 8:
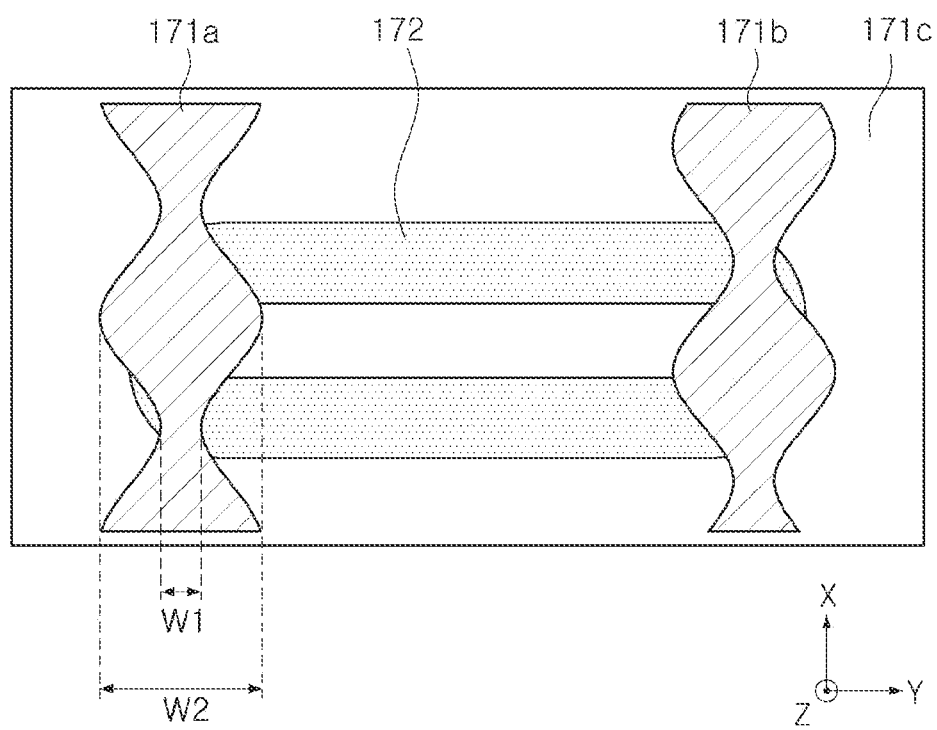
FIG. 8 is a diagram illustrating a sensing yoke portion and a sensing coil of a position sensor portion according to an example embodiment.

FIG. 7A illustrates an example in which a position sensor portion is further included in a sensor shifting actuator. FIG. 7B is a diagram illustrating a schematic configuration of a position sensor portion. FIG. 8 is a diagram illustrating a sensing yoke portion and a sensing coil of a position sensor portion according to an example embodiment.

Referring to FIGS. 7A, 7B, and 8, the sensor shifting actuator 100, according to an example embodiment of the present disclosure, may further include a position sensor portion 160.

For example, when the image sensor 111 is moved in a first direction (X-direction), a position of the image sensor 111 may be sensed by the position sensor portion 160. When the image sensor 111 is moved in a second direction (Y-direction), the position of the image sensor 111 may be sensed by the position sensor portion 160.

The position sensor portion 160 may include a first position sensor 170 and a second position sensor 180. The first position sensor 170 may be used to detect the position of the image sensor 111 in the first direction (X-direction), and the second position sensor 180 may be used to detect the position of the image sensor 111 in the second direction (Y-direction).

The first position sensor 170 may include a first sensing coil 172 and a first sensing yoke portion 171. One of the first sensing coil 172 and the first sensing yoke portion 171 may be disposed on the movable portion 141 of the sensor substrate 140, and the other one may be disposed on the base 130. In an example embodiment, the first sensing yoke portion 171 may be disposed on the base 130, and the first sensing coil 172 may be disposed on the movable portion 141 of the sensor substrate 140. Accordingly, the first sensing coil 172 may be a movable member moving together with the movable portion 141.

The first sensing coil 172 and the first sensing yoke portion 171 may be disposed to oppose each other in an optical axis (Z-axis) direction.

The first sensing yoke portion 171 may include a first sensing yoke 171a and a second sensing yoke 171b spaced apart from each other.

The second position sensor 180 may include a second sensing coil 182 and a second sensing yoke portion 181. One of the second sensing coil 182 and the second sensing yoke portion 181 may be disposed on the movable portion 141 of the sensor substrate 140, and the other one may be disposed on the base 130. In an example embodiment, the second sensing yoke portion 181 may be disposed on the base 130, and the second sensing coil 182 may be disposed on the movable portion 141 of the sensor substrate 140. Accordingly, the second sensing yoke portion 181 may be a movable member moving together with the movable portion 141.

The second sensing coil 182 and the second sensing yoke portion 181 may be disposed to oppose each other in the optical axis (Z-axis) direction.

The second sensing yoke portion 181 may include a third sensing yoke 181a and a fourth sensing yoke 181b spaced apart from each other.

Configurations and sensing methods of the first position sensor 170 and the second position sensor 180 may be the same. Thus, only the first position sensor 170 will be described below for ease of description.

An inductance of the first sensing coil 172 may be changed according to a change in position of the opposing first sensing yoke portion 171.

Specifically, when the relative positions of the first sensing coil 172 and the first sensing yoke portion 171 are changed, the magnitude of the eddy current of the first sensing yoke portion 171 affecting the inductance of the first sensing coil 172 may change, and the intensity of a magnetic field according to the eddy current may change, and accordingly, the inductance of the first sensing coil 172 may be changed.

The first sensing yoke portion 171 may be a conductor or a magnetic material.

The sensor shifting actuator 100 may determine a displacement of the image sensor 111 from a change in the inductance of the first sensing coil 172. As an example, the sensor shifting actuator 100 may additionally include at least one capacitor, and the at least one capacitor and the first sensing coil 172 may form a predetermined oscillation circuit.

As an example, at least one capacitor may be provided to correspond to the number of first sensing coils 172, and one capacitor and one first sensing coil 172 may be configured in the form of a predetermined LC oscillator. In addition, the at least one capacitor and the first sensing coil 172 may be configured in the form of a well-known Colpitts oscillator.

The sensor shifting actuator 100 may determine the displacement of the image sensor 111 from a change in frequency of an oscillation signal generated by the oscillation circuit. Specifically, when the inductance of the first sensing coil 172 forming the oscillation circuit is changed, the frequency of the oscillation signal generated by the oscillation circuit may be changed, such that the displacement of the image sensor 111 may be detected based on the change in frequency.

Referring to FIG. 8, the first sensing yoke portion 171 may include a first sensing yoke 171a and a second sensing yoke 171b.

In an example embodiment, the first sensing yoke portion 171 may further include a supporting member 171c on which the first sensing yoke 171a and the second sensing yoke 171b are disposed. The supporting member 171c may be attached to the base 130.

The first sensing yoke 171a and the second sensing yoke 171b may be manufactured to be attached to the supporting member 171c, or to be integrated with the supporting member 171c by an insert injection process.

However, the present disclosure is not limited thereto, and the first sensing yoke portion 171 may not include the supporting member 171c. In this case, the first sensing yoke 171a and the second sensing yoke 171b may be manufactured to be directly attached to the base 130, or to be integrated with the base 130 by the insert injection process.

The first sensing yoke 171a and the second sensing yoke 171b may be spaced apart from each other in the second direction (Y-direction). In addition, each sensing yoke may be disposed to oppose a portion of the first sensing coil 172. For example, the first sensing yoke 171a and the second sensing yoke 171b may be disposed to oppose the first sensing coil 172 in the optical axis (Z-axis) direction, respectively.

A direction of current flowing in a portion of the first sensing coil 172 opposing the first sensing yoke 171a may be different from a direction of current flowing in a portion of the first sensing coil 172 opposing the second sensing yoke 171b. In an example embodiment, the direction of the current flowing in the portion of the first sensing coil 172 opposing the first sensing yoke 171a may be opposite to the direction of the current flowing in the portion of the first sensing coil 172 opposing the second sensing yoke 171b.

A distance between the first sensing yoke 171a and the second sensing yoke 171b in the second direction (Y-direction) may be shorter than a distance between opposite ends of the first sensing coil 172 in the second direction (Y-direction).

The first sensing yoke 171a and the second sensing yoke 171b may respectively have a width varying depending on the coordinates of a direction in which the image sensor 111 is moved (for example, an X-direction).

The first sensing yoke 171a and the second sensing yoke 171b may respectively output magnetic flux caused by eddy current. A magnitude of the eddy current and a magnitude of the magnetic flux may be dependent on each other.

A magnitude of eddy current that may be formed in each of the first sensing yoke 171a and the second sensing yoke 171b may be dependent on a width of a portion in which the first sensing yoke 171a and the second sensing yoke 171b, and the first sensing coil 172 oppose each other.

For example, the first sensing coil 172 may move in the first direction (X-direction) from viewpoints of the first sensing yoke 171a and the second sensing yoke 171b, and thus the magnitude of the eddy current that may be formed in each of the first sensing yoke 171a and the second sensing yoke 171b may be dependent on relative movement of the first sensing coil 172 in the first direction (X-direction).

An inductance of the first sensing coil 172 may be a sum or difference of a mutual inductance caused by the magnetic flux and a self-inductance of the first sensing coil 172, and thus the inductance may vary depending on a magnitude of the magnetic flux caused by the eddy current. A position of the image sensor 111 may be sensed based on the inductance of the first sensing coil 172.

As a change in the magnitude of the eddy current of each of the first sensing yoke 171a and the second sensing yoke 171*b* according to movement displacement of the image sensor 111 is linear, the position of the image sensor 111 may be more precisely sensed.

The first sensing yoke 171*a* and the second sensing yoke 171*b* may respectively have a shape having a width repeatedly increasing or decreasing in the direction in which the image sensor 111 is moved (for example, X-direction). The width may refer to a width in the second direction (Y-direction).

For example, the first sensing yoke 171*a* may have a shape having a width repeatedly decreasing-increasing-decreasing-increasing in the first direction (X-direction). The second sensing yoke 171*b* may have a shape having a width repeatedly decreasing-increasing-decreasing-increasing in the first direction (X-direction).

In an example, each of the first sensing yoke 171*a* and the second sensing yoke 171*b* may be hourglass-shaped.

The first sensing yoke 171*a* and the second sensing yoke 171*b* may respectively have a shape having a width increasing or decreasing in a direction, and the first sensing yoke 171*a* and the second sensing yoke 171*b* may have shapes different from each other in terms of a position of the increasing or decreasing width.

The first sensing yoke 171*a* and the second sensing yoke 171*b* may have a plurality of minimum widths and a plurality of maximum widths, respectively.

A boundary line defining a width of each sensing yoke may have a sinusoidal wave form.

A winding thickness of the first sensing coil 172 may be greater than a minimum width of each sensing yoke, and may be less than a maximum width of each sensing yoke.

A position at which the first sensing yoke 171*a* has a minimum width may be different from a position at which the second sensing yoke 171*b* has a minimum width. In addition, a position at which the first sensing yoke 171*a* has a maximum width may be different from a position at which the second sensing yoke 171*b* has a maximum width.

Accordingly, coordinates in a direction (for example, X-direction) of the image sensor 111 corresponding to the maximum width (maximum width in the second direction (Y-direction)) of the first sensing yoke 171*a* may be different from coordinates in a direction (for example, X-direction) of the image sensor 111 corresponding to the maximum width (maximum width in the second direction (Y-direction)) of the second sensing yoke 171*b*.

For example, X-direction coordinates of the image sensor 111 corresponding to a minimum width W1 of the first sensing yoke 171*a* may be different from X-direction coordinates corresponding to the minimum width of the second sensing yoke 171*b*. X-direction coordinates corresponding to a maximum width W2 of the first sensing yoke 171*a* may be different from X-direction coordinates corresponding to the maximum width of the second sensing yoke 171*b*.

Accordingly, influence of displacement in a direction of the first sensing yoke 171*a* in a magnitude pattern change of the eddy current of the first sensing yoke 171*a* according to the relative movement of the first sensing coil 172 and the influence of displacement in a direction of the second sensing yoke 171*b* in a magnitude pattern change of the eddy current of the second sensing yoke 171*b* according to the relative movement of the sensing coil 172 may be complementary to each other.

Accordingly, the inductance of the first sensing coil 172 may more stably change according to the integration of an inductance change factor according to the change in the magnitude of the eddy current of the first sensing yoke 171*a* and an inductance change factor according to the change in the magnitude of the eddy current of the second sensing yoke 171*b*. The sensor shifting actuator 100, according to an example embodiment of the present disclosure, may more stably and/or accurately detect movement of the image sensor 111, and may linearly and/or efficiently detect the movement of the image sensor 111.

A length of the first sensing yoke 171*a* in the first direction (X-direction) may be one or more cycles of a cycle of the width of the first sensing yoke 171*a*, and a length of the second sensing yoke 171*b* in the first direction (X-direction) may be one or more cycles of a cycle of the width of the second sensing yoke 171*b*.

The width of each of the first sensing yoke 171*a* and the second sensing yoke 171*b* may be repeated per cycle. A first direction (X-direction) length of the cycle of the width of each of the first sensing yoke 171*a* and the second sensing yoke 171*b* may vary depending on a movement detection range of the image sensor 111.

Due to a difference between the coordinates in a direction (for example, X-direction) of the image sensor 111 corresponding to the maximum width of the first sensing yoke 171*a* and the coordinates in a direction (for example, X-direction) of the image sensor 111 corresponding to the maximum width of the second sensing yoke 171*b*, an output value of the first sensing coil 172 according to the movement of each sensing yoke may be a sinusoidal wave having a phase difference of 90 degrees.

Accordingly, an output value obtained by performing arctangent processing on an output of the sinusoidal wave having a phase difference of 90 degrees may be linear with respect to the movement of the image sensor 111.

The first sensing yoke 171*a* and the second sensing yoke 171*b* may respectively include at least one of copper, silver, gold, and aluminum. Copper, silver, gold, and aluminum may have relatively high conductivity, and thus an overall magnitude of the eddy current formed in each of the first sensing yoke 171*a* and the second sensing yoke 171*b* according to a magnetic flux of the first sensing coil 172 may increase, and movement detection sensitivity of the image sensor 111 may be further improved.

Depending on the design, the first sensing coil 172 may include a plurality of sensing coils to which the inductance change factor according to the change in the magnitude of the eddy current of the first sensing yoke 171*a* and the inductance change factor according to the change in the magnitude of the eddy current of the second sensing yoke 171*b* are respectively applied. In this case, the first sensing yoke 171*a* and the second sensing yoke 171*b* may be disposed to oppose different sensing coils.

Respective inductances of the plurality of sensing coils may be used together to generate information on the movement of the image sensor 111, such that the inductance change factor according to the change in the magnitude of the eddy current of the first sensing yoke 171*a* and the inductance change factor according to the change in the magnitude of the eddy current of the second sensing yoke 171*b* may be integrally used, and the sensor shifting actuator 100 according to an example embodiment of the present disclosure may more linearly sense the movement of the image sensor 111.

Figure 9A:
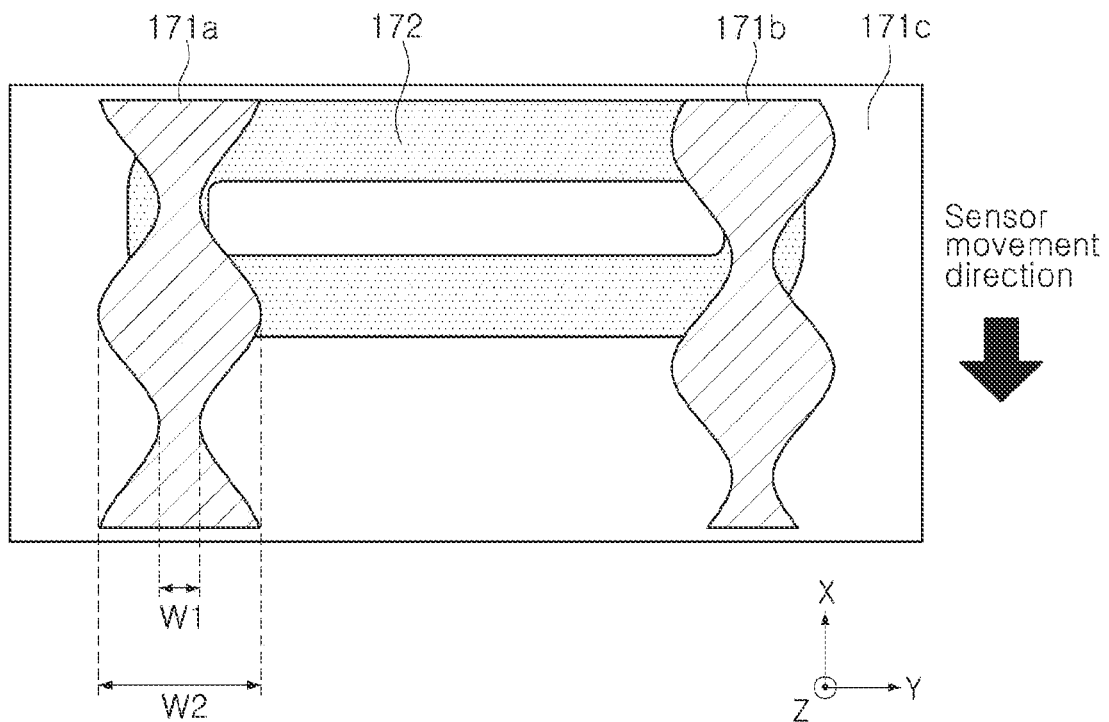
FIGS. 9A and 9B are diagrams illustrating a change in the positional relationship between a first sensing yoke portion and a first sensing coil according to the movement of an image sensor in a position sensor portion according to an example embodiment.
Figure 9B:
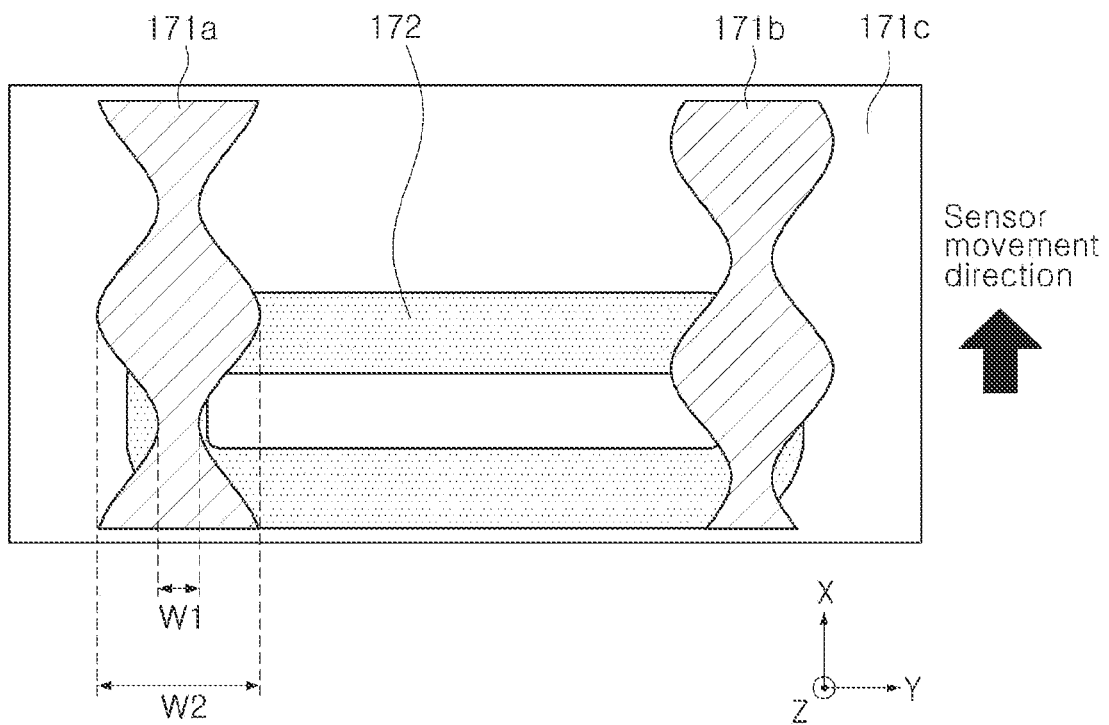

FIGS. 9A and 9B are diagrams illustrating a change in the positional relationship between a first sensing yoke portion and a first sensing coil according to the movement of an image sensor in a position sensor portion according to an example embodiment.

Referring to FIGS. 9A and 9B, a width of the first sensing yoke portion 171 may change in a movement direction of the image sensor 111. Thus, according to the movement of the image sensor 111, a change may occur in a region where the first sensing yoke portion 171 and the first sensing coil 172 overlap in an optical axis (Z-axis) direction.

Widths of parts of the first sensing coil 172 and the first sensing yoke 171a and the second sensing yoke 171b overlapping in the optical axis (Z-axis) direction may vary according to the movement of the first sensing yoke 171a and the second sensing yoke 171b in a first direction (X-direction). Accordingly, an inductance of the first sensing coil 172 may vary according to movement of the image sensor 111 in a first direction (X-direction), and the movement of the image sensor 111 in the first direction (X-direction) may be sensed.

Figure 10:
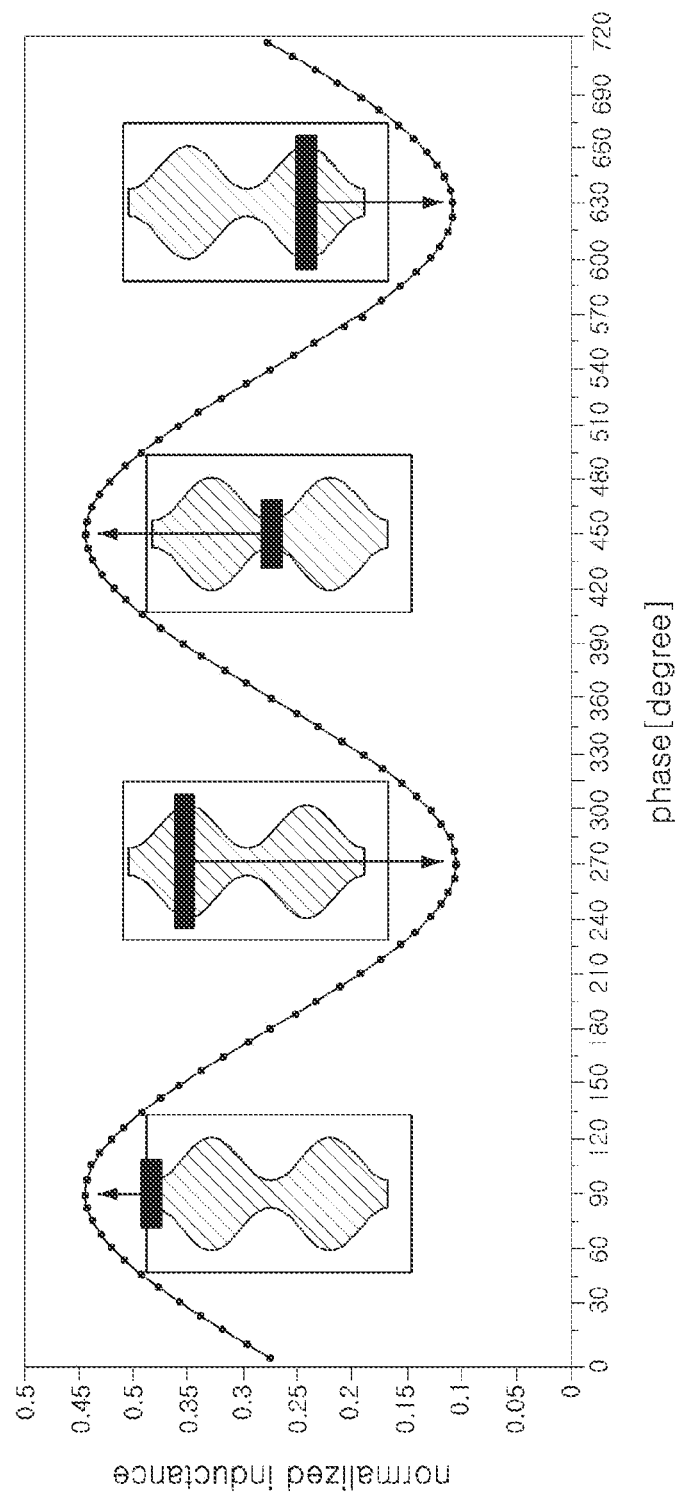
FIG. 10 is a graph illustrating an inductance of a first sensing coil according to the movement of an image sensor in a direction.

FIG. 10 is a graph illustrating an inductance of a first sensing coil according to the movement of an image sensor in a direction.

Referring to FIG. 10, a cycle of a width of the first sensing yoke 171a may correspond to a phase of 360 degrees.

When a specific region (for example, a central portion of the first sensing coil 172) of the first sensing coil 172 and a minimum width of the first sensing yoke 171a overlap, a normalized inductance of the first sensing coil 172 may have a maximum value.

When the specific region (for example, the central portion of the first sensing coil 172) of the first sensing coil 172 and a maximum width of the first sensing yoke 171a overlap, the normalized inductance of the first sensing coil 172 may have a minimum value.

Here, normalization may be a value obtained by applying a specific weight to an inductance.

Figure 11A:
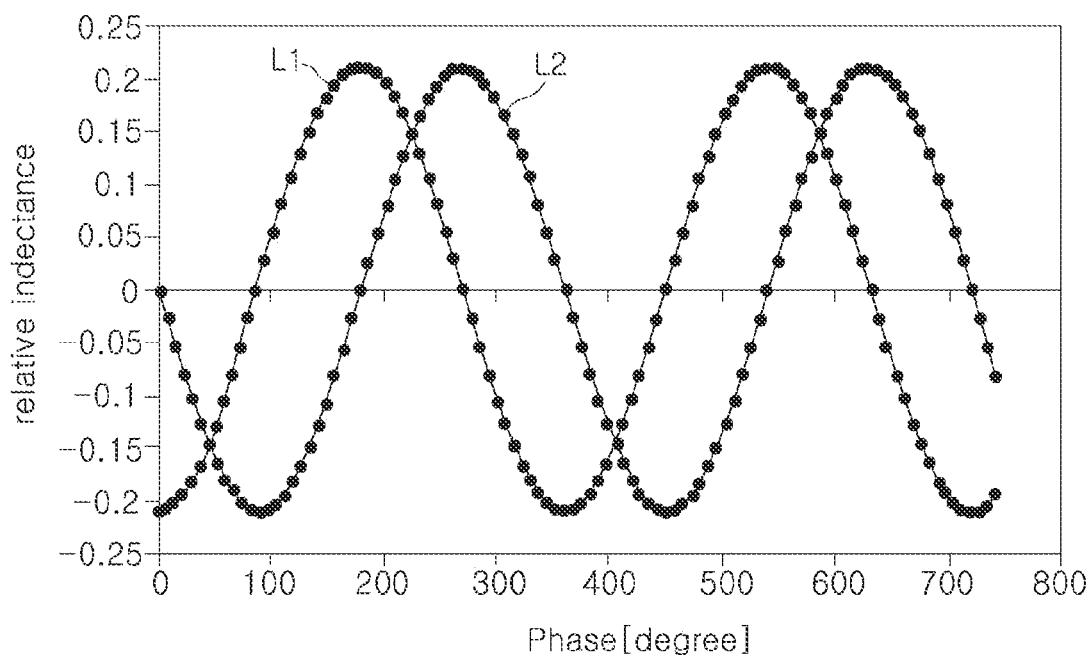
FIG. 11A is a graph illustrating a plurality of inductances of a first sensing coil respectively corresponding to a first sensing yoke and a second sensing yoke of a sensor shifting actuator according to an example embodiment of the present disclosure.

FIG. 11A is a graph illustrating a plurality of inductances of a first sensing coil, respectively, corresponding to a first sensing yoke and a second sensing yoke of a sensor shifting actuator according to an example embodiment of the present disclosure.

Referring to FIG. 11A, a phase difference between a first inductance L1 of the first sensing coil 172 corresponding to the first sensing yoke 171a and a second inductance L2 of the first sensing coil 172 corresponding to the second sensing yoke 171b may be 90 degrees. Here, an inductance may be a value obtained by subtracting a specific value such that an average value of a normalized inductance becomes 0.

Figure 11B:
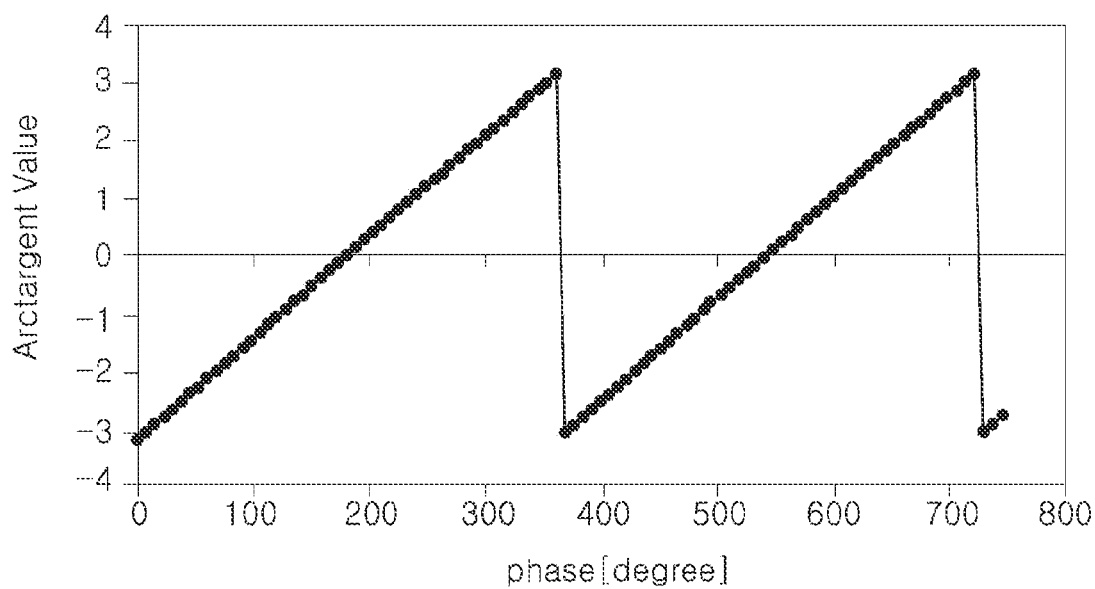
FIG. 11B is a graph illustrating arctangent processing values of a plurality of inductances illustrated in FIG. 11A.

FIG. 11B is a graph illustrating arctangent processing values of a plurality of inductances illustrated in FIG. 11A.

Referring to FIG. 11B, an arctangent processing value may change linearly with respect to a change in phase.

When the first inductance L1 and the second inductance L2 have a phase difference of 90 degrees therebetween, one of the first inductance L1 and the second inductance L2 may correspond to {sin(phase)}, and the other one may correspond to {cos(phase)}.

In a trigonometric function model, an angle from an origin point to a point of a circle may correspond to a phase of one cycle of a sensing yoke, a distance from the origin point to the point of the circle may be r, and an X-direction vector value and a Y-direction vector value from the origin point to the point of the circle may be X and Y, respectively.

{sin(phase)} may be (y/r), and {cos(phase)} may be (x/r). {tan(phase)} may be (y/x), {sin(phase)}/{cos(phase)}, and (second inductance)/(first inductance).

Accordingly, arctan{(second inductance)/(first inductance)} may correspond to a phase of one cycle of a displacement identification layer, and may be an arctan processing value.

Figure 12:
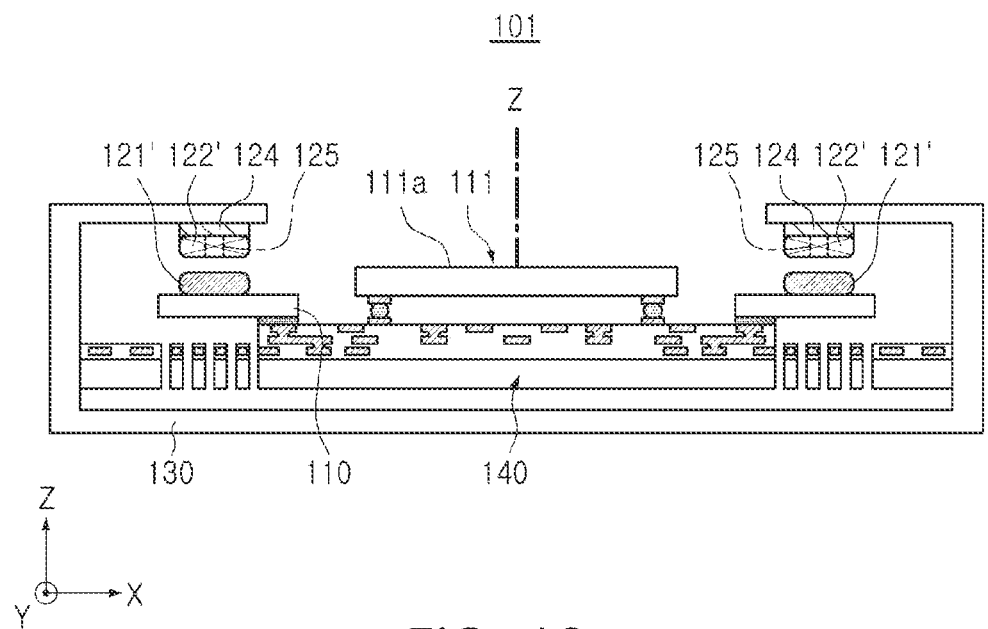
FIG. 12 is a schematic cross-sectional view of a sensor shifting actuator according to another example embodiment of the present disclosure.

FIG. 12 is a schematic cross-sectional view of a sensor shifting actuator according to another example embodiment of the present disclosure.

Referring to FIG. 12, there is a difference in terms of a configuration of a driver and a configuration of a position sensor portion, as compared to the sensor shifting actuator described above, descriptions other than descriptions of the driver and the position sensor portion will be omitted.

The driver 120 may include a coil portion 122' coupled to one of the holder 110 and the base 130, and a magnet portion 121' coupled to the other one of the holder 110 and the base 130.

Referring to FIG. 12, the coil portion 122' may be coupled to the base 130, and the magnet portion 121' may be coupled to the holder 110. In this case, the substrate 124 may be disposed between the base 130 and the coil portion 122'.

However, the present disclosure is not limited thereto, and the coil portion 122' may be coupled to the holder 110, and the magnet portion 121' may be coupled to the base 130.

The coil portion 122' and the magnet portion 121' may be disposed to oppose each other in the optical axis (Z-axis) direction. For example, in the embodiment shown in FIG. 12, the magnet portion 121' is a moving member moving together with the holder 110, and the coil portion 122' is a fixed member fixed to the base 130.

In an example embodiment, the coil portion 122' may include four coils disposed in the corner region of the sensor substrate 140, and the magnet portion 121' may include four magnets. When viewed from the optical axis (Z-axis) direction, each coil and each magnet may be disposed to be positioned in a space between the connection portion 146 and the fixed portion 142 of the sensor substrate 140.

The image sensor 111 may move in a direction orthogonal to the optical axis (Z-axis) with respect to the base 130 by the electromagnetic force between the coil portion 122' and the magnet portion 121'.

Referring to FIG. 12, the position sensor portion 125 may be a Hall sensor and may be disposed on the base 130 to face the magnet portion 121'.

Figure 13:
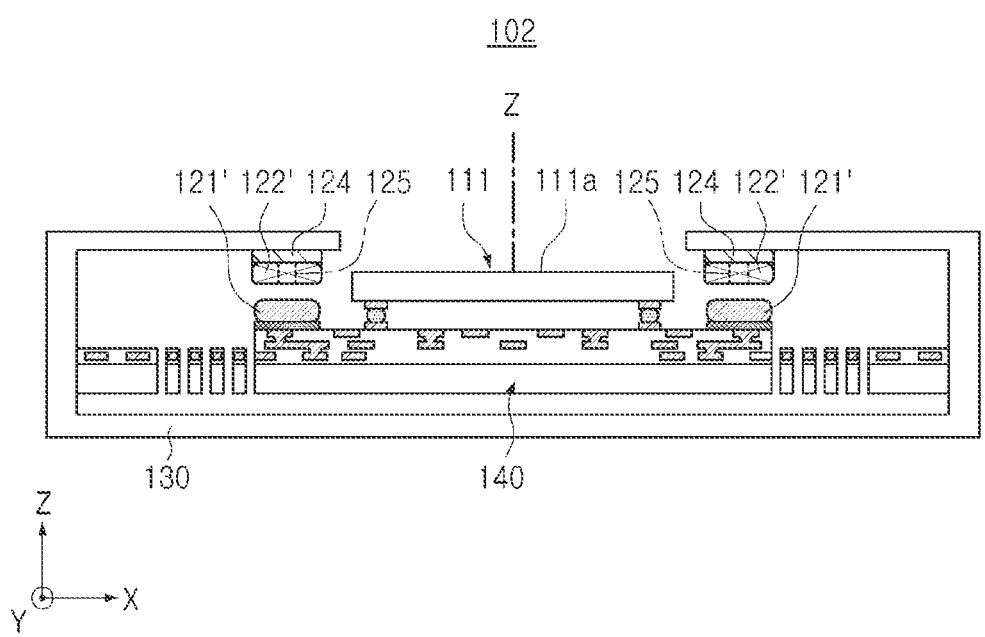
FIG. 13 is a schematic cross-sectional view of a sensor shifting actuator according to another example embodiment of the present disclosure.

FIG. 13 is a schematic cross-sectional view of a sensor shifting actuator according to another example embodiment of the present disclosure.

Referring to FIG. 13, the magnet portion 121' may be coupled to the movable unit 141 of the sensor substrate 140, and the coil portion 122' may be coupled to the base 130. In this case, the substrate 124 may be disposed between the base 130 and the coil portion 122'.

However, the present disclosure is not limited thereto, and the coil portion 122' may be coupled to the movable portion 141 of the sensor substrate 140, and the magnet portion 121' may be coupled to the base 130.

A configuration of the position sensor portion 125 may be the same as that in FIG. 12.

For reference, it is also possible to apply a configuration of the position sensor portion 160 described with reference to FIGS. 7A to 11B to the example embodiments of FIGS. 12 and 13 without using a Hall sensor as the position sensor portion 125.

Figure 14:
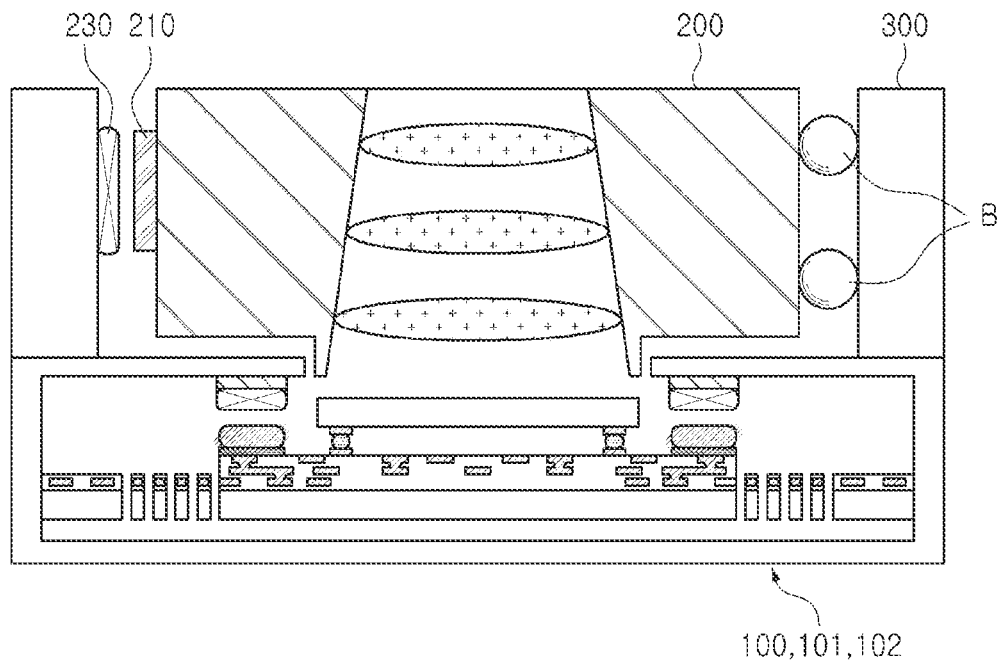
FIG. 14 is a schematic cross-sectional view of a camera module according to an example embodiment of the present disclosure.

FIG. 14 is a schematic cross-sectional view of a camera module according to an example embodiment of the present disclosure.

Referring to FIG. 14, a camera module, according to an example embodiment of the present disclosure, may include a lens module 200, a housing 300, and a sensor shifting actuator 100.

At least one lens for imaging a subject may be accommodated in the lens module 200. When a plurality of lenses are disposed, the plurality of lenses may be mounted inside the lens module 200 along an optical axis (Z-axis).

The lens module 200 may have a hollow cylindrical shape.

In another example embodiment, the lens module 200 may include a lens barrel and a lens holder. In this case, at least one lens may be accommodated in the lens barrel, and the lens barrel may be coupled to the lens holder.

The lens module 200 may be accommodated in the housing 300. In addition, the housing 300 may be coupled to the base 130 of the sensor shifting actuator 100.

The sensor shifting actuator 100 may be the sensor shifting actuator 100 according to an example embodiment of the present disclosure described above.

An image sensor 111 may be disposed in the sensor shifting actuator 100, and the image sensor 111 may be moved by the driver 120 in a first direction (X-direction) and a second direction (Y-direction).

Accordingly, a shake correction function may be performed by moving the image sensor 111.

According to an example embodiment of the present disclosure, a camera module may perform shake correction by moving the image sensor 111 instead of the lens module 200. The image sensor 111 may be relatively light; thus, the camera module may include the image sensor 111 with a smaller magnitude of driving force. Accordingly, the camera module may be miniaturized.

In addition, the lens module 200 may be moved in an optical axis (Z-axis) direction with respect to the housing 300. Accordingly, a focus may be adjusted by movement of the lens module 200 in the optical axis (Z-axis) direction.

A focus adjustment driver may include a magnet 210 and a coil 230 generating driving force in the optical axis (Z-axis) direction, the magnet 210 may be attached to the lens module 200, and the coil 230 may be mounted on the housing 300 to oppose the magnet 210. A substrate for applying power to the coil 230 may be disposed in the housing 300. The coil 230 may be disposed on a surface of the substrate.

When power is applied to the coil 230, the lens module 200 may move in the optical axis (Z-axis) direction by the electromagnetic force between the magnet 210 and the coil 230.

When the lens module 200 is moved, a ball member B may be disposed between the lens module 200 and the housing 300 to reduce friction between the lens module 200 and the housing 300. The ball member B may include a plurality of balls.

A guide groove portion for accommodating the ball member B may be formed on at least one of the surfaces of the lens module 200 and the housing 300 opposing each other in a direction orthogonal to an optical axis (Z-axis).

The ball member B may be accommodated in the guide groove portion to be fitted between the lens module 200 and the housing 300.

A yoke may be disposed to oppose the magnet 210 in the direction orthogonal to the optical axis (Z-axis). As an example, the yoke may be disposed on the other surface of the substrate. Accordingly, the yoke may be disposed to oppose the magnet 210 with the coil 230 interposed therebetween.

Attractive force may act between the yoke and the magnet 210 in the direction orthogonal to the optical axis (Z-axis).

Accordingly, the ball member B may maintain a contact state with the lens module 200 and the housing 300 by the attractive force between the yoke and the magnet 210.

In addition, a position sensor opposing the magnet 210 may be disposed on the substrate.

In FIG. 14, the ball member B may be disposed on an opposite side of the magnet 210. However, such a configuration is for illustration of the ball member B, and the ball member B may be disposed in a position capable of maintaining the contact state with the lens module 200 and the housing 300 by the attractive force between the magnet 210 and the yoke.

Figure 15:
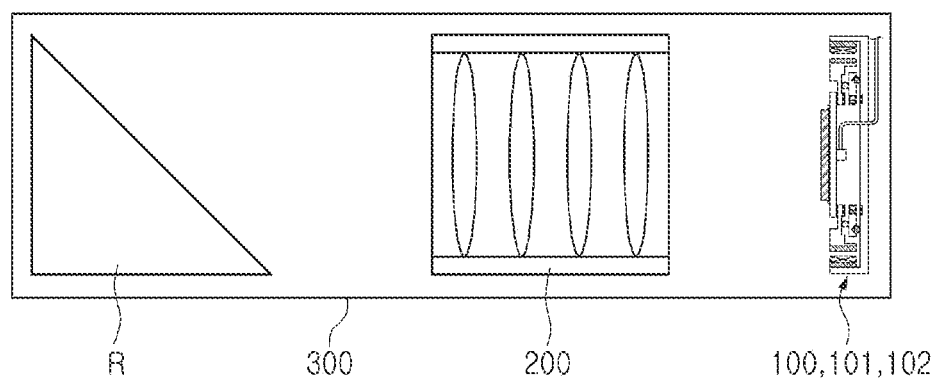
FIG. 15 is a schematic cross-sectional view of a camera module according to another example embodiment of the present disclosure.

FIG. 15 is a schematic cross-sectional view of a camera module according to another example embodiment of the present disclosure.

Referring to FIG. 15, a camera module 20, according to another example embodiment of the present disclosure, may include the housing 300, a reflective member R, the lens module 200, and the sensor shifting actuator 100.

In the present example embodiment, an optical axis (Z-axis) of the lens module 200 may be disposed in a direction orthogonal to a thickness direction of a portable electronic device (a direction from a front surface to a rear surface of the portable electronic device or vice versa).

For example, the optical axis (Z-axis) of the lens module 200 may be formed in a width or length direction of the portable electronic device.

When components included in the camera module are stacked in the thickness direction of the portable electronic device, the thickness of the portable electronic device may increase.

However, in the camera module 20 of the present embodiment, the optical axis (Z-axis) of the lens module 200 may be formed in the width or length direction of the portable electronic device, thereby reducing the thickness of the portable electronic device.

The reflective member R and the lens module 200 may be disposed in the housing 300. However, it is also possible to dispose the reflective member R and the lens module 200 in separate housings, and to couple the respective housings to each other.

The reflective member R may be configured to change a travel direction of light. As an example, a travel direction of light incident into the housing 300 may be changed to be directed to the lens module 200 through the reflective member R. The reflective member R may be a mirror or a prism reflecting light.

The sensor shifting actuator 100 may be coupled to the housing 300.

The sensor shifting actuator 100 may be the sensor shifting actuator 100 according to an example embodiment of the present disclosure described above.

The image sensor 111 may be disposed in the sensor shifting actuator 100, and the image sensor 111 may be moved in a first direction (X-direction) and a second direction (Y-direction), or may be rotated using the optical axis (Z-axis) as a rotation axis.

Accordingly, a shake correction function may be performed by moving the image sensor 111.

In addition, the lens module 200 may be moved in an optical axis (Z-axis) direction with respect to the housing 300. Accordingly, a focus may be adjusted by movement of the lens module 200 in the optical axis (Z-axis) direction.

A configuration of the focus adjustment driver may be the same as that of the focus adjustment driver 210 described with reference to FIG. 14, and thus a detailed description thereof will be omitted.

According to example embodiments of the present disclosure, a sensor shifting actuator and a camera module including the sensor shifting actuator may improve shake correction performance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting actuator comprising:
a sensor substrate on which an image sensor having an imaging surface is disposed;
a base configured to accommodate the sensor substrate; and
a driver configured to drive the image sensor in a first direction and a second direction, parallel to the imaging surface,
wherein the sensor substrate includes a movable portion on which the image sensor is disposed, a fixed portion coupled to the base, and a connection portion disposed between the movable portion and the fixed portion and configured to surround the movable portion,
wherein the movable portion and the connection portion are spaced apart from each other to form a space therebetween, and the connection portion and the fixed portion are spaced apart from each other to form a space therebetween, and
wherein depending on a movement direction of the image sensor, the movable portion and the connection portion relatively move with respect to the fixed portion, or the movable portion relatively moves with respect to the connection portion.

2. The sensor shifting actuator of claim 1, wherein
the sensor substrate further includes a first bridge configured to connect the fixed portion and the connection portion to each other in the first direction, and a second bridge configured to connect the movable portion and the connection portion to each other in the second direction,
each of the first bridge and the second bridge includes a plurality of bridge elements,
the first direction and the second direction are orthogonal to each other, and
each of the bridge elements extends in a connection direction.

3. The sensor shifting actuator of claim 2, wherein
the first bridge elastically deforms when the image sensor moves in the first direction, and
the second bridge elastically deforms when the image sensor moves in the second direction.

4. The sensor shifting actuator of claim 2, wherein
each of the bridge elements has a width and a height, and the width is less than the height, and
the width extends in a direction orthogonal to a length direction of each of the bridge elements, in a plane parallel to the imaging surface, and the height extends in a direction orthogonal to the imaging surface.

5. The sensor shifting actuator of claim 2, wherein
each of the bridge elements includes a bridge part and a trace part disposed at an end of the bridge part, and
a signal of the image sensor is transmitted external of the image sensor by the trace part.

6. The sensor shifting actuator of claim 1, further comprising:
a holder coupled to the movable portion,
wherein the driver includes a coil portion disposed on one of the holder or the base, and a movable yoke portion disposed on another of the holder or the base, and
the movable yoke portion is formed of a soft magnetic material magnetized by a magnetic field of the coil portion.

7. The sensor shifting actuator of claim 6, wherein the coil portion and the movable yoke portion are disposed to oppose each other in a direction parallel to the imaging surface.

8. The sensor shifting actuator of claim 6, wherein an upper surface of the movable portion is positioned higher in a direction, orthogonal to the imaging surface, than an upper surface of the fixed portion and an upper surface of the connection portion.

9. The sensor shifting actuator of claim 1, wherein
the driver includes a coil portion disposed on one of the movable portion or the base, and a magnet portion disposed on another of the movable portion or the base, and
the coil portion and the magnet portion are disposed to oppose each other in a direction orthogonal to the imaging surface.

10. The sensor shifting actuator of claim 9, wherein
the fixed portion is configured to surround the connection portion, and
the coil portion and the magnet portion are positioned in a space between the fixed portion and the connection portion, when viewed from the direction orthogonal to the imaging surface.

11. The sensor shifting actuator of claim 1, comprising:
a position sensor portion configured to sense a position of the image sensor, the position sensor portion including a sensing coil disposed on one of the movable portion or the base, and a sensing yoke portion disposed on another of the movable portion or the base,
wherein the sensing yoke portion includes a plurality of sensing yokes spaced apart from each other in the direction parallel to the imaging surface, and
a width of each of the sensing yokes is configured to change in the movement direction of the image sensor.

12. A sensor shifting actuator comprising:
a sensor substrate on which an image sensor having an imaging surface is disposed;
a base configured to accommodate the sensor substrate; and
a driver configured to drive the image sensor in a first direction and a second direction, parallel to the imaging surface; and
a position sensor portion configured to sense a position of the image sensor,
wherein the sensor substrate includes a movable portion on which the image sensor is disposed, a fixed portion coupled to the base, and a connection portion disposed between the movable portion and the fixed portion, wherein depending on a movement direction of the image sensor, the movable portion and the connection portion relatively move with respect to the fixed portion, or the movable portion relatively moves with respect to the connection portion, wherein the position sensor portion includes a sensing coil disposed on one of the movable portion or the base, and a sensing yoke portion disposed on another of the movable portion or the base, wherein the sensing yoke portion includes a plurality of sensing yokes spaced apart from each other in the direction parallel to the imaging surface, wherein a width of each of the sensing yokes is configured to change in the movement direction of the image sensor, wherein the plurality of sensing yokes include a first sensing yoke and a second sensing yoke, and wherein each of the first sensing yoke and the second sensing yoke oppose the sensing coil in the direction orthogonal to the imaging surface.

13. The sensor shifting actuator of claim 12, wherein
each of the first sensing yoke and the second sensing yoke has an increasing or decreasing width in the movement direction of the image sensor, and the first sensing yoke and the second sensing yoke have shapes different from each other in terms of a position of the increasing or decreasing width.

14. The sensor shifting actuator of claim 12, wherein
each of the first sensing yoke and the second sensing yoke has an hourglass-shape, and the first sensing yoke and the second sensing yoke are offsettedly spaced apart from each other.

15. The sensor shifting actuator of claim 12, wherein dimensions of the hourglass-shapes of the first sensing yoke and the second sensing yoke are different.

16. A camera module comprising:
a lens module including at least one lens;
a housing configured to accommodate the lens module;
a focus adjustment driver configured to move the lens module in an optical axis direction;
a sensor substrate having an image sensor disposed thereon;
a base coupled to the housing, the base configured to accommodate the sensor substrate; and
a shake correction driver configured to drive the image sensor in a first direction and a second direction, orthogonal to the optical axis direction, wherein the sensor substrate includes a movable portion configured to move with the image sensor in the first direction and the second direction, a fixed portion coupled to the base, and a connection portion disposed between the movable portion and the fixed portion and configured to surround the movable portion, wherein the connection portion is configured to move with the movable portion in the first direction or the second direction, and wherein the movable portion and the connection portion are spaced apart from each other to form a space therebetween, and the connection portion and the fixed portion are spaced apart from each other to form a space therebetween.

17. The camera module of claim 16, wherein
the sensor substrate further includes a first bridge configured to connect the fixed portion and the connection portion to each other in the second direction, and a second bridge configured to connect the movable portion and the connection portion to each other in the first direction, and each of the first bridge and the second bridge includes at least one electrical trace configured to transmit a signal external of the image sensor.

18. The camera module of claim 16, further comprising:
a reflective member disposed in front of the lens module, the reflective member configured to change a path of incident light to the lens module.

* * * * *